(12) United States Patent
Kloeppel et al.

(10) Patent No.: US 12,541,797 B2
(45) Date of Patent: Feb. 3, 2026

(54) SYSTEMS AND METHODS FOR GENERATING, MAINTAINING, AND USING PORTABLE DATA ON A BLOCKCHAIN

(71) Applicant: STATE FARM MUTUAL AUTOMOBILE INSURANCE COMPANY, Bloomington, IL (US)

(72) Inventors: Kimberly Christine Kloeppel, Mesa, AZ (US); Ellakate LeFebre, Mesa, AZ (US); Steve Amancha, Tempe, AZ (US); Ross Wheeler, Scottsdale, AZ (US); Kimberly Doak-Wigginton, Congerville, IL (US); Stephen Dunstan, Tempe, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 356 days.

(21) Appl. No.: 17/988,682

(22) Filed: Nov. 16, 2022

(65) Prior Publication Data

US 2024/0119534 A1    Apr. 11, 2024

Related U.S. Application Data

(60) Provisional application No. 63/415,720, filed on Oct. 13, 2022, provisional application No. 63/413,319, filed on Oct. 5, 2022.

(51) Int. Cl.
*G06Q 40/08* (2012.01)
*G06Q 20/38* (2012.01)

(52) U.S. Cl.
CPC .......... *G06Q 40/08* (2013.01); *G06Q 20/3821* (2013.01); *G06Q 20/389* (2013.01); *G06Q 2220/00* (2013.01)

(58) Field of Classification Search
CPC .. G06Q 40/08; G06Q 20/3821; G06Q 20/389; G06Q 2220/00; G06Q 30/0201;
(Continued)

(56) References Cited

U.S. PATENT DOCUMENTS 9,830,748 B2    11/2017    Rosenbaum
9,990,782 B2    6/2018    Rosenbaum
(Continued)

FOREIGN PATENT DOCUMENTS

EP    3239686 A1    11/2017
EP    3578433 B1    8/2020
(Continued)

OTHER PUBLICATIONS

Singh et al., A blockchain-based approach for usage based insurance and incentive in ITS, Tencon 2019, IEEE Region 10 Conference (2019).

*Primary Examiner* — Elda G Milef
(74) *Attorney, Agent, or Firm* — MARSHALL, GERSTEIN & BORUN LLP; William J. Samore

(57) ABSTRACT

Systems and methods are disclosed for generating one or more smart contracts for deployment onto a blockchain. The systems and methods may include (1) receiving vehicle information related to a vehicle; (2) analyzing the vehicle information to identify one or more safety features installed in the vehicle; (3) generating, based upon the one or more safety features identified, a smart contract that may be configured to (i) maintain a set of indications related to whether safety features in the one or more safety features installed in the vehicle have been activated, and (ii) automatically execute on the blockchain based upon the maintained set of indications; and/or (4) deploying the smart contract at a particular address on the blockchain.

19 Claims, 10 Drawing Sheets

(58) Field of Classification Search
CPC ..... G06Q 30/0206; G06Q 30/0611; G06F 18/25; H04L 2209/84; H04L 9/3239; H04L 9/3247; H04L 9/50

See application file for complete search history.

(56) References Cited

U.S. PATENT DOCUMENTS

| | | | |
|---|---|---|---|
| 10,269,190 B2 | 4/2019 | Rosenbaum | |
| 10,284,654 B2 | 5/2019 | Alvarez et al. | |
| 10,467,824 B2 | 11/2019 | Rosenbaum | |
| 10,719,501 B1 * | 7/2020 | Leise | G06Q 40/00 |
| 10,721,274 B1 | 7/2020 | Prasad | |
| 10,726,493 B1 | 7/2020 | Kyne et al. | |
| 10,929,931 B1 | 2/2021 | Bryant et al. | |
| 11,030,699 B1 | 6/2021 | Floyd | |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 11,628,351 B2 * | 4/2023 | Tran | A61B 5/6804 700/91 |
| 11,776,061 B1 | 10/2023 | Leise et al. | |
| 11,900,465 B1 | 2/2024 | Floyd et al. | |
| 12,045,372 B2 | 7/2024 | Nation et al. | |
| 2015/0248731 A1 * | 9/2015 | Fernandes | G08G 5/0039 705/4 |
| 2018/0091596 A1 * | 3/2018 | Alvarez | H04L 63/0428 |
| 2020/0357075 A1 | 11/2020 | Dahl | |
| 2021/0264526 A1 * | 8/2021 | Bryant | G06Q 30/0283 |
| 2022/0036465 A1 | 2/2022 | Fields et al. | |
| 2022/0092893 A1 | 3/2022 | Rosenbaum | |
| 2022/0340148 A1 | 10/2022 | Rosenbaum | |
| 2023/0001936 A1 | 1/2023 | Skaggs et al. | |
| 2023/0060300 A1 | 3/2023 | Rosenbaum | |
| 2023/0260038 A1 | 8/2023 | Sundaravadivel et al. | |
| 2024/0012455 A1 | 1/2024 | Wu et al. | |

FOREIGN PATENT DOCUMENTS

| | | | |
|---|---|---|---|
| EP | 3730375 B1 | 10/2021 | |
| EP | 3960576 A1 | 3/2022 | |
| EP | 4190659 A1 | 6/2023 | |
| EP | 4190660 A1 | 6/2023 | |
| WO | WO-2022150124 A1 * | 7/2024 | B60R 25/54 |

* cited by examiner

800

RECEIVING, FROM A REQUESTOR, A REQUEST TO CALCULATE AN INSURANCE PREMIUM FOR AN ASSET ASSOCIATED WITH A RECORD ON THE BLOCKCHAIN, WHEREIN THE RECORD INCLUDES AN INDICATION OF A LOCATION AT WHICH HISTORICAL TELEMATICS DATA ASSOCIATED WITH THE INSURED ASSET IS LOCATED ~ 802

OBTAINING THE HISTORICAL TELEMATICS DATA FROM THE INDICATED LOCATION ~ 804

ANALYZING THE HISTORICAL TELEMATICS DATA TO DERIVE THE INSURANCE PREMIUM ~ 806

TRANSMITTING AN INDICATION OF THE DERIVED INSURANCE PREMIUM TO THE REQUESTOR ~ 808

FIGURE 8

SYSTEMS AND METHODS FOR GENERATING, MAINTAINING, AND USING PORTABLE DATA ON A BLOCKCHAIN

CROSS-REFERENCE TO RELATED APPLICATIONS

This application is a claims the benefit of U.S. Patent Application No. 63/413,319, entitled "Systems and Methods for Generating, Maintaining, and Using Information Stored on a Blockchain", filed Oct. 5, 2022 and U.S. Patent Application No. 63/415,720, entitled "Systems and Methods for Generating, Maintaining, and Using Information Stored on a Blockchain", filed Oct. 13, 2022, the entire contents of which are hereby expressly incorporated herein by reference.

TECHNICAL FIELD

The present disclosure generally relates to generating smart contracts for a distributed ledger that governs transactions or events, and more particularly, calculating and/or adjusting an insurance premium based upon information stored on a blockchain.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Properly generating and maintaining vehicle build sheets is difficult. Often, companies rely on the data stored on vehicle build sheets to conduct business, but it is not uncommon for information on vehicle build sheets to be missing (either due to recordation error, a lack of standard in the industry to record the same levels of information, or lost documents). As such, companies often must fill the missing data by contacting the vehicle manufacturer, the initial purchaser of the vehicle, or by inspecting the vehicle itself. Further, even if there is a properly generated vehicle build sheet, maintaining the vehicle build sheet to keep it up-to-date may be equally difficult.

Additionally, it may be difficult to calculate and/or adjust insurance premiums tailored to individual drivers or home owners/residents. When calculating insurance premiums for prospective customers, insurance providers may not know the safety habits of the prospective customer unless they are monitored during a test period. Similarly, when adjusting insurance premiums of existing insurance customers, insurance providers may not have the data collected outside of claims filed by the customer and available public records. Conventional techniques may have additional inefficiencies, inaccuracies, hindrances, or drawbacks as well.

SUMMARY

In general, the present embodiments may relate to, inter alia, accurate and persistent recordation of vehicle build sheets, calculating and/or adjusting insurance premiums based upon the detected driving performance of existing and prospective insurance customers, and/or calculating and/or adjusting insurance premiums based upon telematics data of vehicles and/or homes. For instance, the disclosed embodiments generally relate to generating and/or maintaining a record on a blockchain based upon sensor data received from the sensors installed on, or within, the vehicle to initiate a calculation and/or adjustment of an insurance premium. For example, vehicle sensor data may be interpreted to be the "ground truth" of whether a safety feature is installed in a vehicle, and thus need not be necessarily verified with manual inspections of the vehicle.

Advantageously, for example, an insurer of the vehicle may instantaneously determine that a safety feature is installed in the vehicle based upon the received vehicle sensor data in addition to determining when and/or where it was activated (e.g., a smart high beam system active on a highway at night). In this way, the insurer of the vehicle may calculate and/or adjust an insurance premium tailored to a particular operator and/or vehicle. For example, a discount may be provided for the installation of certain safety features and further discounts may be made based upon their enablement and use in certain situations. Thus, having an accurate and up-to-date vehicle record may allow an insurer to properly calculate an insurance premium of new customers.

Similarly, for example, an insurer of a home may instantaneously determine that a parametric event occurred based upon the received home sensor data (e.g., an anti-theft sensor was triggered, or drainage sensors indicate flooding, etc.). In this way, the insurer of a home may be able to contact the property owner and/or resident, as well as contact other entities (e.g., police, home repair contractors, etc.) to address the parametric event.

The asset records (such as vehicle records, home records, etc.) on the blockchain may also be employed to maintain data upon which insurance premiums for prospective and/or current customers of insurance providers are calculated. For example, vehicle sensor data associated with a vehicle record and/or indications derived therefrom may provide historical vehicle usage data upon which an insurance premium may be derived and/or adjusted. In addition to the sensor data, the asset record may include public records associated with the vehicle and/or home, insurance records, as well as any other records associated with the vehicle and/or home. As such, the asset record may act as a repository for the underlying data that insurance providers need to tailor insurance premium estimates to individual drivers and/or home owners/residents.

To employ a proactive approach, a blockchain-based solution is described herein. A large dataset of telematics data from numerous vehicles and/or homes may be analyzed to determine one or more triggering events. As an example, analysis of the large dataset of vehicle sensor data from a vehicle may indicate that a safety feature is installed in the vehicle. As another example, analysis of vehicle sensor data may indicate that a safety feature was active during a specific location (e.g., adaptive cruise control was active while the vehicle was on a highway). As another example, analysis of the large dataset of vehicle sensor data from numerous vehicles may indicate that a broken window of vehicles correlates to a parametric event of theft of item(s) in vehicles. As another example, analysis of vehicle sensor data may indicate that isolated damage of vehicles (e.g., the front but not the back) correlates to a parametric event of a relatively small collision (e.g., the vehicles drove into trees, mailboxes, etc.), whereas extensive damage of vehicles (e.g., body of vehicles severely damaged) correlates to a parametric event of a relatively large collision (e.g., the vehicles suffered total loss beyond repair). As another example, analysis of the large dataset of home sensor data may indicate that a basement is flooding and/or detect the presence of an electrical fault that may increase the likelihood of a fire occurring.

For each triggering event determined from the large dataset of telematics data, a corresponding smart contract may be generated for deployment onto a shared leger (i.e., the blockchain), to define action(s) when the triggering event actually occurs. For example, the actions may include generating and/or maintaining a vehicle build sheet, initiating processes for calculating and/or adjusting one or more insurance premiums, initiating processes for claiming a notice of loss, initiating processes for servicing the vehicle, and/or causing one or more entities to exchange information about the vehicle and/or home.

The blockchain may manage an asset record according to the generated smart contracts. Data related to the asset record (i.e., vehicle sensor data and/or home sensor data) and in some cases, any supplemental information (e.g., weather data, image data, etc.) may be included in transactions and/or events included in the blockchain. For example, the data may be written to the blockchain by sensors installed on or within the vehicle and/or home, personal electronic devices associated with the vehicle and/or home, smart controllers associated with the vehicle and/or home, and/or supplemental sources. The deployed smart contracts may detect the transactions and/or events recorded to the blockchain and self-execute to generate an asset record update an asset record, calculate and/or adjust an insurance premium, initiate a claim for a loss associated with the vehicle and/or home, and/or provide assistance to an individual associated with the asset.

Advantages will become more apparent to those of ordinary skill in the art from the following description of the preferred embodiments, which have been shown and described by way of illustration. As will be realized, the present embodiments may be capable of other and different embodiments, and their details may be capable of modification in various respects. Accordingly, the drawings and description are to be regarded as illustrative in nature and not as restrictive.

BRIEF DESCRIPTION OF THE DRAWINGS

The figures described below depict various embodiments of the systems and methods disclosed herein. It should be understood that each figure depicts a particular embodiment of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 8 depicts an exemplary computer-implemented method for calculating and/or adjusting an insurance premium based upon portable data associated with a blockchain.

Figure 1A:
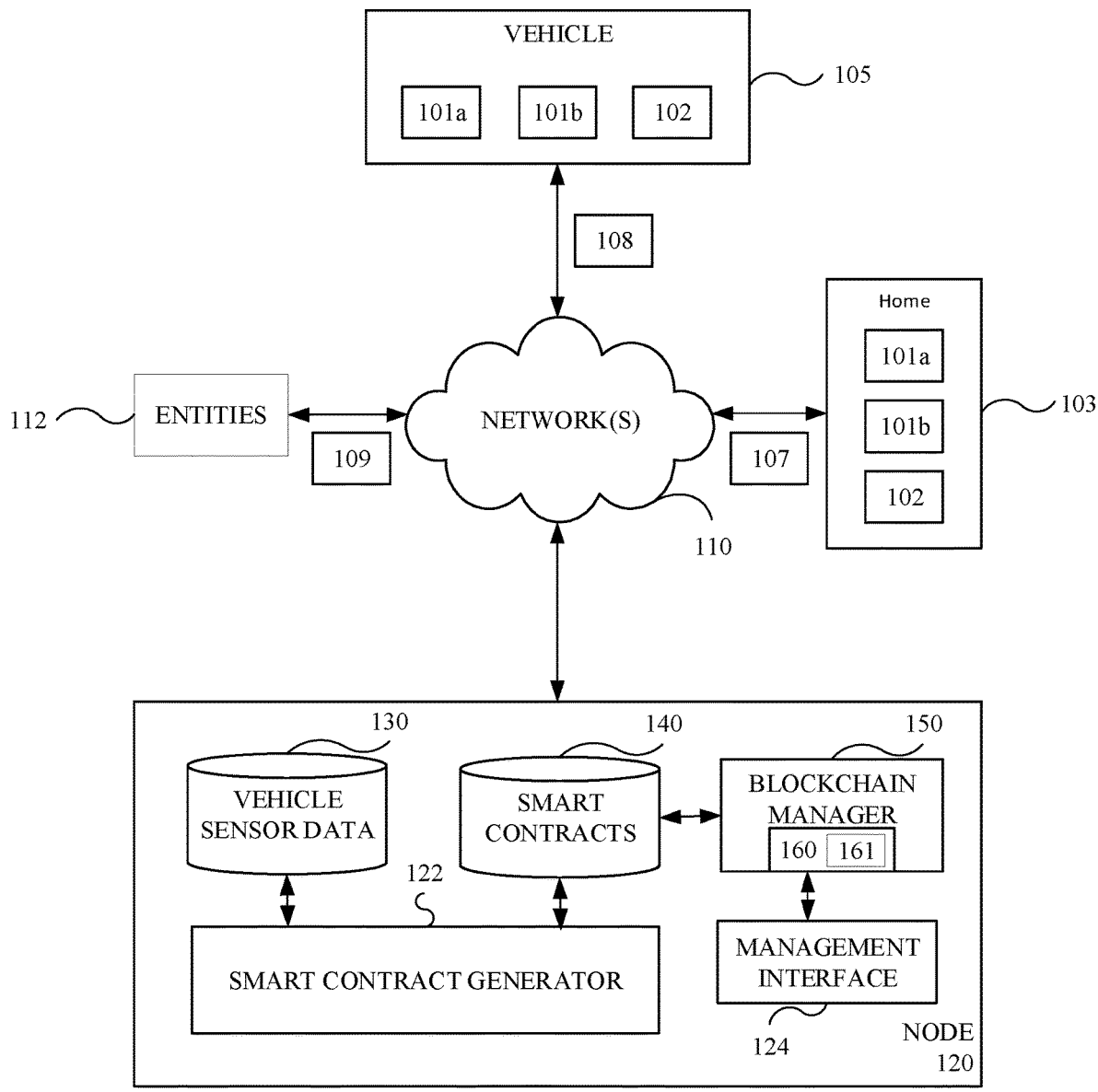
FIG. 1A depicts an exemplary computing system including components and apparatuses associated with creating, deploying, and utilizing smart contracts on a blockchain to generate and maintain an accurate and up-to-date vehicle build sheet, in accordance with some embodiments.

The figures depict the present embodiments for purposes of illustration only. One skilled in the art will readily recognize from the following discussion that alternate embodiments of the structures and methods illustrated herein may be employed without departing from the principles of the invention described herein.

DETAILED DESCRIPTION

When an individual associated with an asset (e.g., a vehicle, a home, and/or another type of asset) looks to purchase insurance, it may often be difficult to properly calculate an insurance quote tailored to the actual usage of the asset. Discounts on insurance premiums are often awarded based upon safety features installed in the home and/or vehicle (e.g., advanced driver assistance systems (ADAS) or advanced vehicle safety features (AVSF) such as smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, driver assist technologies, semi-autonomous and/or autonomous technologies and systems, home security cameras, electricity usage monitors, water usage monitors, occupancy monitors, smart smoke detectors, etc.). Techniques disclosed herein relate integrating blockchain technology to overcome these challenges.

A blockchain (also referred to herein as a distributed ledger or a shared ledger) is a way of achieving a distributed consensus on the validity or invalidity of information in the chain (such as a vehicle build sheet, vehicle records, home records usage data associated with a home and/or vehicle, etc.). In other words, the blockchain provides a decentralized trust to participants and observers. As opposed to relying on a central authority, a blockchain is a decentralized database in which a transactional record of changes to the ledger is maintained and validated by each node of a peer-to-peer (P2P) network. The blockchain may be comprised of groupings of transactions organized together into a "block," and ordered sequentially (thus the term "blockchain"). Nodes may join and leave the blockchain network over time and may obtain blocks that were propagated while the node was gone from peer nodes. Nodes may maintain addresses of other nodes, and exchange addresses of known nodes with one another to facilitate the propagation of new information across the network in a decentralized, P2P manner.

In one application of the blockchain, each new block may be cryptographically linked to the previous block in order to form the blockchain. More particularly, to create a new block, each transaction within a block may be assigned a hash value (i.e., an output of a cryptographic hash function, such as SHA-2 or MD5). These hash values may then be combined together utilizing cryptographic techniques (e.g., a Merkle Tree) to generate a hash value representative of the entire new block. This hash value may then be combined with the hash value of the previous block to form a hash value included in the header of the new block, thereby cryptographically linking the new block to the blockchain. To this end, the precise value utilized in the header of the new block may be dependent on the hash value for each transaction in the new block, as well as the hash value for each transaction in every prior block.

According to some embodiments, the hash value generated for the new block may be used as an input to a cryptographic puzzle that manipulates a nonce value. When a solution to the cryptographic puzzle is found, the solving node publishes the solution and the other nodes then verify that the solution is the correct solution. Because the solution may also depend on the particular hash values for each transaction within the blockchain, if the solving node attempted to modify any transaction, the solution would not be verified by the other nodes.

More particularly, if a single node attempts to modify a prior transaction within the blockchain, a cascade of different hash values may be generated for each tier of the cryptographic combination technique. This may result in the header for one or more blocks being different than the corresponding header(s) in every other node that did not make the exact same modification. As a result, the solution generated by the modifying node would not solve the cryptographic puzzle presented to any node without the identical modification. Thus, the version of the new block generated by the modifying node may be readily recognized as including an improper modification and rejected by the consensus. This inability to modify past transactions lead to blockchains being generally described as trusted, secure, and/or immutable.

The nodes that share the blockchain form what is referred to herein as the blockchain network. The nodes may each store a respective copy of the blockchain and/or validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supplies a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules may be propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule may be disregarded by validating nodes that receive the change and is not propagated to other nodes. Accordingly, unlike a traditional system which uses a central authority, a single party cannot unilaterally alter the distributed ledger unless the single party does so in a way that satisfies the consensus rules. The inability to modify past transactions leads to blockchains being generally described as trusted, secure, and immutable.

The validation activities of nodes applying consensus rules on a blockchain network may take various forms. In some embodiments, the validating nodes execute code contained in "smart contracts" and distributed consensus may be expressed as the network nodes agreeing on the output of the executed code.

Blockchains may be deployed in a public, decentralized, and permissionless manner meaning that any party may view the blockchain, submit new information to be added to the blockchain, or join the network as a validating node. Other blockchains may be private (e.g., permissioned ledgers) that keep chain data private among a group of entities authorized to participate in the blockchain network. The blockchain may be either a public or private ledger.

As it is generally used herein, an "asset record" is a record on a blockchain and/or distributed ledger where various types of data associated with an insured asset is maintained. Accordingly, participants in the blockchain network (e.g., vehicle manufacturers, building constructors, drivers, homeowners/residents, insurers, vehicle service providers, home repair providers, governmental agencies, and so on) may query the asset records to obtain data associated therewith. For example, a vehicle record may include a vehicle build sheet, ownership information, insurance information, telematics data, and/or other information related to the vehicle. As another example, a home record may include building blueprints and/or schematics, ownership information, insurance information, telematics data, and/or other information related to the home. In some embodiments, rather than storing the raw data, the asset record instead includes a location at which the raw data may be obtained (e.g., a FTP location, an IPFS location, or other peer-to-peer file location, etc.). In these embodiments, the asset record may include a hash of the raw data for validation that the raw data has not been modified.

A vehicle build sheet included in a vehicle record may include a listing of the vehicle's features. Typically, vehicle build sheets may include identifying information of the vehicle (e.g., vehicle identification number (VIN)), build data (e.g., vehicle make, model, year, vehicle specifications, optional features and technology, etc.), and/or the like. The vehicle build sheet may be generated by original equipment manufacturers (OEMs) after manufacture. After generating the vehicle build sheet, the OEM may initiate a request with the blockchain to generate a new vehicle record that includes the vehicle build sheet.

However, in some instances, the vehicle build sheet may be inaccurate. As such, the vehicle build sheet may not be a reliable indicator of all of the safety features included in a particular vehicle. For example, safety features that are actually included in the vehicle may never have been initially recorded to the vehicle build sheet (either due to clerical error or a lack of standardization of vehicle build sheets) or have been modified by an after-market alteration (for example, when a vehicle is sold second-hand, either by an individual or used-car dealership). Accordingly, for insurance products that provide discounts based upon usage of safety features, it may be difficult to obtain a ground truth of the set of safety features included in the insured vehicle.

Moreover, even if the safety features of a given vehicle are known, it may be difficult to properly classify and record these safety features because different vehicle manufacturers often use different terminology for the same or similar safety technology. For example, while many OEMs manufacture vehicles enabled with blind spot detection, one OEM may call this feature "lane change assist," while another OEM calls this feature "blind spot monitor." Furthermore, in some examples, one OEM may use different terminology for the same feature in marketing (e.g., "pre-sense") compared to in technical documents (e.g., "blind spot information system").

Additionally, even if the vehicle build sheet included an accurate record of the installed safety features installed, the mere inclusion of a safety feature may be insufficient to attain the corresponding benefit of improved vehicle safety for insurance rating purposes. For example, adaptive cruise control may need to be manually enabled by the user to attain the corresponding improvement in vehicle safety. If it is determined that the operator appropriately uses the installed safety features, an insurer may be able to provide a larger discount than if the safety feature was never activated. However, it may be difficult to reliably determine whether the safety features were ever enabled or used to provide discounts tailored to the insured's vehicle and/or their driving habits.

One solution to this problem is to configure asset records maintained on a blockchain to provide indications of the underlying telematics data and/or event data based thereon. Accordingly, by integrating asset records into the blockchain, the immutable, verifiable, updatable ledger, nature of the blockchain provides a source of trust between parties having an interest in the asset.

One example blockchain network particularly adapted for monitoring and insuring homes and/or vehicles may be the Mobility Open Blockchain Initiative (MOBI) blockchain. The MOBI blockchain may be built upon Citopia, a member-owned and operated Web3 marketplace that establishes a connected economical ecosystem and IoT commerce allowing stakeholders to securely transact. In addition to IoT commerce, the MOBI blockchain may also be used to track vehicle usage, water usage, electricity usage, etc.

One of the many advantages of the MOBI blockchain is the adoption, integration, and use of a Decentralized Identity (DID). One example of a DID is described in U.S. Provisional Patent Application No. 63/400,717 filed Aug. 24, 2022, the entirety of which is hereby incorporated by reference. A DID may be a cryptographically-signed credential for use on a blockchain. Accordingly, the DID may be assigned to blockchain participants and/or vehicles associated with vehicle records for usage when transacting with the blockchain network. While a DID may be associated with the MOBI blockchain, similar techniques may be applied to other types of blockchain networks on which the disclosed techniques are implemented.

Systems and methods of determining the installation, usage, and effectiveness of home and/or vehicle safety features are provided herein. In particular, one or more vehicle build sheets and/or building blueprints/schematics may be initially obtained from one or more OEMs and/or building constructors respectfully. Ontological mapping of similar or same safety features, as labelled by the one or more OEMs/building constructors, may be performed to generate a unified list of safety features to record to a "collective build sheet" (interchangeably referred herein as "vehicle build sheet" and/or "building blueprint" and/or "schematic"). The collective build sheet may be recorded onto a blockchain and associated with a home and/or vehicle, thereby incorporating the collective build sheet into the asset record.

Sensor data referenced by the asset record may be cross-referenced to an original vehicle build sheet of the vehicle as provided by the OEM and/or an original blueprint/schematic of the home as provided by the constructor to determine which safety features are installed in the home and/or vehicle. For example, the collective build sheet included in the asset record may be cross-referenced against telematics data captured by sensors associated with the home and/or vehicle and/or a data log from a computing device associated with the home and/or vehicle. In some examples, telematics data captured by sensors associated with the home and/or vehicle may be analyzed to determine whether or not certain safety features were activated during certain situations (e.g., using adaptive cruise control on a highway). Moreover, in some examples, a data log from a computing device associated with the home and/or vehicle may be analyzed to determine whether the safety feature had been updated at the time of use, or what version of software associated with the safety feature was installed at the time of use.

The safety feature usage data may be used to generate a responsibility score for a home owner/resident and/or vehicle operator. For example, the responsibility score may reflect that the user is activating the safety features when appropriate, that the operator is performing software updates to the safety features, and/or that the user is performing regular maintenance of the safety features.

As another example, the safety features included in a collective build sheet included in a particular asset record may be cross-referenced to home and/or vehicle accident records associated with a plurality of different asset records having a similar set of safety features to determine an effectiveness score for each safety feature installed in the home and/or vehicle. For example, the effectiveness score may be based upon historical effectiveness data of each safety feature, such as a number, frequency, severity, etc. of accidents associated with the safety feature.

Additionally, in some embodiments, the telematics data captured by sensors associated with the home and/or vehicle may be analyzed to determine whether or not the safety feature was activated at the time of a loss event. For example, the data log from a computing device associated with a home and/or vehicle may be analyzed to determine whether the safety feature had been updated at the time of the loss event, or what version of software associated with the safety feature was used at the time of the loss event. Therefore, the effectiveness score for the safety feature may also be based upon the historical usage patterns associated with the safety feature and/or the impact the usage of the safety feature has on home/vehicle safety.

The effectiveness scores for various safety features may be compared, ranked, etc. For example, the effectiveness scores for the safety features of a given home and/or vehicle may be provided to consumers to assess which homes, vehicles, and/or safety features are safest (e.g., when renting a home and/or vehicle, when purchasing a home and/or vehicle, when being transported by a vehicle when using a taxi or ride share service, etc.). As another example, the effectiveness scores for the safety features of a given home and/or vehicle may be provided to OEMs and/or building constructors to use to improve safety features and/or to develop more effective safety features.

Furthermore, in some examples, the effectiveness scores for the various safety features and the responsibility score of the insured may be used to determine an insurance rating score for the asset. Conventionally, insurance rating scores for home and/or vehicles may be based upon the make, model, and year of the vehicle as indicated by the vehicle's VIN and/or the location of the home based upon the home's address. However, the disclosed techniques relate to implementing asset records that track actual usage of assets and/or safety features associated therewith enables insurers to more accurately assess the risks associated with asset usage. For at least this reason, the disclosed determination of insurance ratings based upon the effectiveness scores for the smart safety features and/or the responsibility scores of the insureds improves upon conventional methods of determining insurance rating scores for insureds.

Additionally, the records may be used to eliminate the need for a trial period for potential customers of telematics-based insurance products. In a conventional scenario, the new insurance provider does not have access to historical telematics data indicating how the potential customer operates their home and/or vehicle. Accordingly, the insurance provider may need to collect telematics data from the potential customer over a trial period (e.g., two weeks) before developing a sufficient baseline to offer a personalized quote. Often, potential customers lose interest in the telematics-based insurance product over the course of the trial period, resulting in a low conversion rate of potential customers that undergo the trial period into purchasers of the telematics-based insurance product.

In contrast, techniques disclosed herein relate to providing vehicle operators and property owners and/or residents control over their telematics data. For example, the asset record maintained on the blockchain may reference the historical telematics data. Additionally, according to certain aspects, the owner and/or resident of a home and/or the operator of a vehicle may control third party access to the specific types of data referenced by their asset record. Accordingly, if a vehicle operator or property owner and/or resident wants an insurance quote from a provider of telematics-based insurance products, the operator, owner, and/or resident may specify that the insurance provider is to receive access to the historical telematics data referenced in their asset record. By receiving access to the historical telematics data, the insurance provider may no longer need the trial period to develop a baseline model. As a result, the insurance provider may provide a personalized quote based upon historical telematics contemporaneous to receiving the request to provide the quote.

Exemplary Smart Contract Functionality

According to certain aspects, the present embodiments may relate to, inter alia, creating and deploying smart contracts onto a blockchain. For example, the smart contracts may be deployed to enforce agreements related to a telematics-based insurance policy, control of a data owner's telematics data, generating and maintaining vehicle build sheets, and/or other agreements between blockchain participants. Participants (interchangeably referred herein as an "entity", "party", or "participant") may include an insurer entity, vehicle manufacturer entity, a vehicle and/or an operator thereof, a home and/or an owner and/or resident thereof, a body shop, emergency service providers, towing services, and a State Department of Motor Vehicles (DMV) entity, just to name a few.

Each smart contract described herein may be a set of code that is deployed at a particular address on the blockchain, that, when executed, causes action(s) defined in the smart contract to be automatically initiated when certain triggering event(s) defined in the smart contract occur. Generally, the triggering events may correspond to "parametric events," a lapsing of a predetermined amount of time, the triggering of an asset sensor, and/or the like. Parametric events may refer to certain events inferred from the telematics data that relate to the condition of the asset (for example, loss events). Parametric events may be defined by smart contracts on the blockchain, and one or more smart contracts may be associated with particular parametric events.

The action(s) defined in the smart contract may involve generating and/or maintaining a vehicle build sheet, initiating processes for calculating and/or adjusting one or more insurance premiums, initiating processes for claiming a notice of loss, initiating processes for servicing the home and/or vehicle, causing one or more entities to exchange information about the home with an owner or resident of the home (e.g., property owner, tenant, visitor, policy holder of the home, etc.) or vice versa or with one or more other entities, and/or causing one or more entities to exchange information about the vehicle with an operator of the vehicle (e.g., driver of the vehicle, owner of the vehicle, policy holder of the vehicle) or vice versa or with one or more other entities.

For example, one smart contract may include a triggering event of the manufacture of a vehicle and an action event of (i) generating a vehicle record from a collective build sheet and/or (ii) populating a vehicle record based upon vehicle sensor data. As another example, one smart contract may include a triggering event of recognizing that a safety feature of a vehicle is (i) missing from the vehicle record, (ii) mislabeled in the vehicle record, and/or (iii) has multiple conflicting labels across multiple OEM vehicle build sheets occurs and an action event of writing the correct information to the vehicle record. As another example, one smart contract may include a triggering event of a potential customer requesting an insurance quote and an action event of using the data (including telematics data) associated with the corresponding asset record to calculate an insurance quote.

As another example, one smart contract may include a triggering event of a date being reached (e.g., the first of the month) and an action event of using the data associated with the corresponding asset record a to adjust an insurance premium. As another example, one smart contract may include a triggering event of an occurrence of a parametric event (e.g., an event indicating a loss or other condition of the asset) and an action event being one or more of (1) initiating an instantaneous notice of loss process, (2) tracking maintenance or repair work of the home and/or vehicle that has been, or is to be, performed, (3) contacting first responders, (4) contacting towing services, repair services, taxi services, ride-share services, (5) initiating the processes for adjusting an insurance premium, and/or the like. As such, the blockchain may have various usages, and may allow for the introduction of new capabilities. By using the blockchain, the exchange of information included in transactions is sped up. More particularly, by utilizing smart contracts deployed onto the blockchain, actions related to the vehicle may be automated and executed in an expedited manner.

According to certain aspects, an insured asset may be associated with a node of the blockchain (referred to herein as an "asset node"). For example, the asset node may be a vehicle, a sensor system installed on or within vehicles, a home, a sensor system installed on or within homes, a personal electronic device associated with an insured and/or other computing devices associated with insured assets. As described herein, the asset node may generate and transmit transactions associated with the asset over the blockchain network. For example, the transactions may include indications of events that characterize operation of the asset. Additionally, these transactions may include a node identifier and/or an asset identifier, sensor data collected from one or more sensors installed on or within the vehicle or home, operator or owner/resident information, build data or construction data, supplemental data, insurance carrier information, parametric event ID, maintenance and repair data, and/or any other data.

In some embodiments, a blockchain node, such as a server, may generate a particular smart contract to subscribe to one or more feeds of transaction data related to the particular smart contract. Accordingly, the node may route the data included in the subscribed data feeds to the particular smart contract to execute the code of the particular smart contract that determines which, if any, triggering events have occurred. If a triggering event has occurred, the node may execute the corresponding code included in the smart contract that is associated with the occurrence of the triggering event. By executing the code included in the smart contract, it may be said that the node performs one or more actions at the direction of the smart contract. In some embodiments, routing the transactions may include extracting identity data (e.g., VIN number, an address, etc.) from the transactions and utilizing the identity data to identify one or more smart contracts related to the extracted identity data. The smart contract that matches the identity data may be considered to be the "particular smart contract."

Additionally, the node may identify the smart contract based upon the asset records. As described above, the asset nodes may write transactions and/or events to the blockchain that include an asset identifier. The node may then utilize the asset identifier to identify the corresponding asset record on the blockchain. As will be described below, the asset record may include a location of one or more smart contracts related to operation of the asset.

According to some embodiments, asset nodes may execute an application to monitor, collect, analyze, and/or otherwise process data that is relevant to the enforcement of a smart contract. For example, the monitored data may include vehicle operational data, vehicle telematics data, vehicle sensor data, vehicle condition data, mileage data, maintenance data, parts data, system data, system or software version data, mobile device data, GPS data, etc. The application may detect the occurrence of one or more events associated with operation of the asset and write a transaction to the blockchain network that includes an indication of the event. Consequently, nodes enforcing a smart contract associated with the asset may route the event to the smart contract for enforcement thereof.

As an example, the application executing on the asset node may process telematics data and/or event data associated with a safety feature to detect the presence of the safety feature. The application may then determine whether the safety feature is properly recorded in the asset record on the blockchain. As another example, the application may process telematics data from a sensor (e.g., an airbag sensor, a glass break sensor, etc.) to detect a parametric event (e.g., that the vehicle was involved in a collision, that a window was broken, etc.).

Exemplary Digital Signatures

As noted above, the blockchain may be private or public, and data on the blockchain may be encrypted to protect data privacy. Similarly, nodes accessing the blockchain may have a form of identification that may be checked by the blockchain (e.g., by smart contracts written thereon) to ensure the nodes have access to perform a requested action associated with the blockchain and/or the data associated therewith.

One way to verify the nodes have valid access is through the implementation of a digital signature or signed credential. For example, a node associated with an asset may want to access the blockchain for the first time to seek an insurance quote. Accordingly, the node may generate a public/private key pair to utilize for interactions with the blockchain. When attempting to access the blockchain, a smart contract on the blockchain may request the public key from the node for storage in a public key repository associated with the blockchain.

In some embodiments, the smart contract may also generate a unique code assigned to node or signed credential to the node. The signed credential may be any form of a self-executing verification credential, including the DID as described in U.S. Provisional Patent Application No. 63/400,717 (which was incorporated by reference in its entirety above). The unique code and/or signed credential may be stored in a web browser, or mobile application executed by the node. When the node attempts to access the blockchain, the node may include a digital signature that encrypts the unique code using the private key of the node's key pair. As a result, a smart contract executing thereon may validate a request by obtaining the node's public key from the public key repository and ensuring that the decrypted digital signature resolves to the unique code and/or credential. Thus, the validation may be based upon both information that is self-sovereign (i.e., the public key) as well as information that smart contracts on the blockchain may use to verify that the node has validated access to the blockchain (i.e., the authentication data).

More particularly, in the signed credential examples, the smart contract may process the access request and determine that the request is valid, due to the presence of the authentication data and/or the public key in a known file format (e.g., a binary distinguished encoding rules (DER) format, XML format, base64 format, etc.) included with the access request. In response to determining that a valid access request has been received, the smart contract may generate the signed credential and provide the signed credential to the node. As such, when the node attempts to interact with the blockchain, the node may include in the interaction request the signed credential for verification by a smart contract.

Exemplary Environments for Creating & Deploying Smart Contracts onto a Blockchain FIG. 1A depicts an exemplary computing system 100 that includes various components that interface with a blockchain network. The computing system 100 may be configured to create and/or deploy smart contracts onto the blockchain network. Although FIG. 1A depicts certain entities, components, and devices, it should be appreciated that additional or alternate entities and components are envisioned.

As illustrated in FIG. 1A, the computing system 100 may include a home 103 and/or a vehicle 105. The home 103 may be a residence (such as a single family home, condominium, apartment, apartment complex, etc.), commercial property, or any other form of real-estate. The home 103 may be a conventional home, a smart home, etc. The vehicle 105 may be a car, truck, bus, van, motorcycle, bike, aircraft, boat, drone, or any other suitable vehicle. The vehicle 105 may be a conventional vehicle, an autonomous vehicle, a smart vehicle, a connected vehicle, etc. The home 103 and/or the vehicle 105 may include one or more sensors 101a-b that generate telematics data including sensor data indicative of an operational or condition status of the vehicle and/or home (e.g., location, speed, idling time, harsh acceleration or braking, fuel consumption, vehicle faults, cornering, direction or heading, electricity usage, water usage, occupancy, etc.). The sensors 101a-b may include, for example, a pressure sensor, a gyroscope, an accelerometer, an odometer, a locationing and/or positioning sensor, a vibration sensor, a microphone, an image sensor, a temperature sensor, glass break sensors, a radar or LIDAR sensor, and/or other suitable sensors. In some embodiments, some of the sensors 101a-b may be OEM sensors installed on or in the vehicle by a manufacturer of the vehicle. In some other embodiments, some of the sensors 101a-b may be installed on or in the home during its construction. In other embodiments, some of the sensors 101a-b may be retrofitted onto the vehicle and/or home after manufacture or construction. In some embodiments, the sensors 101a-b may be configured to wirelessly communicate sensor data via a wireless interface (e.g., a Wi-Fi interface, a cellular interface, or other known wireless communication interfaces) to a node 120 via one or more communication networks 110 (e.g., via wireless communication or data transmission over one or more radio links or digital communication channels).

In some embodiments, the home 103 and/or vehicle 105 may further include an electronic device 102 configured to collect sensor data generated by the sensors 101a-b. The electronic device 102 may be a processing unit of the home 103 and/or vehicle 105 interconnected to the sensors 101a-b via a communication bus of the home 103 and/or vehicle 105, or a personal electronic device (e.g., a mobile phone, a tablet, a laptop computer, a smart watch, smart glasses, augmented reality glasses or headset, virtual reality glasses or headset, other types of wearable electronics, an on-board diagnostic monitor, and so on) associated with an owner of the vehicle 105 or an owner/resident of the home 103. In these embodiments, the electronic device 102 may receive, from the sensors 101a-b, the sensor data via a wireless interface (e.g., a Bluetooth interface, a Wi-Fi interface, or other known wireless communication interfaces) or a wired interface (e.g., an OBD port, a USB interface, an auxiliary interface, or other known wired communication interfaces), and transmit the sensor data to the node 120 via the one or more communication networks 110.

In some embodiments, the node 120 is a server computing device associated with an insurer of vehicles and/or property, a provider of loss event response services, a personal electronic device, and/or other types of computing devices. While FIG. 1A depicts the node 120 being a separate entity as the electronic device 102, in some embodiments, the electronic device 102 may be configured to also operate as the node 120.

The node 120 may include a database 130 to store the sensor data generated by the sensors 101a-b and collected from the home 103 and/or vehicle 105 and/or any other data collected from the home 103 and/or vehicle 105 or other entities 112. The node 120 may also include one or more processors configured to execute a data analysis application (not pictured) that is programmed to analyze data that is collected and/or stored in the database 130 (e.g., the sensor data).

According to certain aspects, the data analysis application may execute on the node 120 to detect the presence of a safety feature in the home 103 and/or vehicle 105. For example, the node 120 may analyze sensor data generated by the vehicle's emergency braking system and/or adaptive cruise control system. As another example, the node 120 may analyze event logs that indicate raw sensor data and/or an identifier of the sensor and/or component associated therewith. In this example, a braking event may include sensor data provided by an accelerometer disposed near a front tire and/or an indication that the braking was initiated by a collision avoidance system. By analyzing these events, the application may determine whether the safety feature is properly recorded in the collective build sheet.

In these embodiments, home 103 and/or vehicle 105 may transmit the telematics data to the node 120. The node 120 may then analyze the telematics data to determine aspects about the home 103 and/or vehicle 105 (e.g., such as determining whether a safety feature was enabled and/or disabled in the appropriate contexts). For example, based upon geolocation data and vehicle sensor data, the node 120 may determine that automated cruise control was enabled and activated while the vehicle 105 was on a highway. Further, the node 120 may also determine whether the safety features were activated in response to road conditions context based upon the analysis of additional data (e.g., date data, time data, and/or weather data). For example, the server may recognize that smart headlights were not enabled during a heavy rain context.

As another example, the data analysis application may be configured to cause the node 120 to analyze the sensor data to detect or identify one or more parametric events which corresponds to a loss event. For instance, the node 120 may analyze at least a portion of the vehicle sensor data (e.g., generated by air bag sensors 101a-b adhered to the vehicle 105) that indicates that a deployment of the air bags of the vehicle 105 which correlates to a parametric event indicative of a collision of the vehicle (e.g., as confirmed by pressure sensors 101a-b on the body of the vehicle 105 indicating external contact with the vehicle has been made). Additionally or alternatively, the node 120 may analyze at least a portion of the home sensor data and/or vehicle sensor data (e.g., generated by glass break sensors 101a-b adhered to the home 103 and/or vehicle 105) that indicates that a broken window of the home 103 and/or vehicle 105 correlates to a parametric event indicative of theft of item(s) in the home 103 and/or vehicle 105 (e.g., as confirmed by dashcam sensors 101a-b located in the interior of vehicles 105 or image sensors 101a-b located on the exterior or in the interior of the home 103 that capture video data conveying items being stolen).

In some embodiments, the data analysis application may analyze other data in addition to the sensor data to identify triggering events. As an example, the data analysis application may analyze other types of telematics data (e.g., data logs) and/or supplemental data (e.g., image data) to identify or confirm identification of a triggering event (e.g., a parametric event). For example, the additional data may be generated by the home 103, the vehicle 105, and/or other sources (e.g., camera installed at a traffic light).

After detecting one or more triggering events based upon analysis of any data collected (e.g., sensor data collected from the home 103 and/or vehicle 105), the one or more processors of the node 120 may execute a smart contract generator 122 (or alternatively, the same data analysis application) to generate an executable smart contract for each of the identified triggering events. In some embodiments, the generated smart contracts may be stored in database 140. In some embodiments, the smart contracts may be stored in asset records associated with assets monitored by the blockchain network.

As described elsewhere herein, the smart contracts may include executable code that defines functions for generating and/or maintaining a vehicle build sheet, initiating processes for calculating and/or adjusting one or more insurance premiums, providing access rights to vehicle telematics data, initiating processes for claiming a notice of loss, initiating processes for servicing the home 103 and/or vehicle 105, initiating the processes for contacting personal assistance (e.g., calling the police, EMTs, etc.), initiating the processes for conducting vehicle assistance (e.g., calling towing services, taxi or ride-share services, vehicle repair services, vehicle salvage services, and/or the like), causing one or more entities 112 to exchange information about the home 103 with an owner or resident of the home (e.g., property owner, tenant, visitor, policy holder of the home, etc.) or vice versa or with one or more other entities 112, and/or causing one or more entities 112 to exchange information about the vehicle 105 with an operator of the vehicle 105 (e.g., driver of the vehicle, owner of the vehicle, policy holder of the vehicle) or vice versa or with one or more other entities 112 in response to the occurrence of an underlying triggering event.

The node 120 may also be configured to deploy the smart contracts onto a blockchain 160. In one example, the smart contracts may be configured to maintain a set of indications related to operation of the home 103 and/or the vehicle 105. For example, a first smart contract may be configured to detect whether safety features installed in the home 103 and/or vehicle 105 have been activated. In this example, a second smart contract may be configured to automatically execute on the blockchain 160 to generate an updated insurance premium based upon the set of indications maintained at the first smart contract. As another example, a smart contract may be configured to control access to telematics data generated at the home 103 and/or vehicle 105. In this example, and the smart contract may be configured to automatically execute on the blockchain 160 to enforce access controls to the telematics data.

The blockchain 160 may generate and/or maintain an asset record 161 associated with an asset (e.g., a home 103 and/or a vehicle 105). For example, an individual may register an assert with the blockchain 160, such as to enroll in a telematics-based insurance product. Accordingly, the registration process may include generating the asset record 161 to maintain and/or control the telematics data related to their asset. For some assets, the asset may be registered with the blockchain 160 upon manufacture. For example, the asset OEM may register newly constructed assets with the blockchain 160 to generate the asset record 161.

In addition to the telematics data, the asset record may include identity data (e.g., VIN, vehicle make, model, year, address, etc.), build and/or construction data of the asset (e.g., vehicle build sheets, building blueprints and/or schematics, collective build sheets), data extracted from public records (e.g., maintained by DMVs, county title registers, etc.) and/or data obtained from the one or more entities 112.

According to some embodiments, the home 103 and/or vehicle 105 may send information as part of a home transaction 107 or a vehicle transaction 108 to the nodes of the blockchain 160 (such as the node 120 and/or a node associated with the one or more entities 112) via the one or more communication networks 110. The transaction information may include identity data (e.g., a VIN number or address or some other identifier of the home 103 and/or vehicle 105, a serial number or some other identifier of any one or more of sensors 101a-b, a serial number or some other identifier of the electronic device 102, a username or number of an account associated with the owner/resident of the home 103 and/or operator of the vehicle 105 or some other identifier of the owner/resident of the home 103 and/or operator of the vehicle 105, etc.), telematics data (including sensor data, location data, event data, etc.), date data, time data, geolocation data, and/or other data.

In some embodiments, the node 120 may analyze supplemental data that indicates additional information that may be relevant to the triggering event, such as third-party weather data, traffic data, image data, etc. For example, the one or more entities 112 act as an oracle to the blockchain 160 to supply the additional information. For example, the one or more entities 112 may include a weather application server, infrastructure smart sensors, traffic cameras, environmental conditions sensors, Internet of Things (IoT) devices, etc. In these embodiments, the one or more entities 112 may write transactions to the blockchain 160 (e.g., an entity transaction 109). Accordingly, smart contracts on the blockchain 160 may utilize the additional data provided in the entity transaction 109 to enforce smart contracts.

The node 120 may extract information from the home transaction 107, vehicle transaction 108, and/or entity transaction 109, and route the extracted information to one or more applicable smart contracts upon receiving the information. For example, the node 120 may utilize the identity data to identify only those smart contracts deployed on the blockchain 160 that are relevant to the home 103 and/or vehicle 105. In turn, the one or more smart contracts self-execute on the node 120 to determine whether a triggering event has occurred.

When the particular smart contract indicates that a triggering event has occurred, the particular smart contract may direct the node 120 to perform an action. For example, the action defined by a particular smart contract may be to update the asset record stored on the blockchain 160 to include indications based upon telematics data or other data included in one or more transactions. As another example, the action defined by a particular smart contract may be to initiate an instantaneous notice of loss with an insurer entity. As another example, the action defined by a particular smart contract may be to initiate an insurance premium generation process. As yet another example, the action defined by a particular smart contract may be to communicate with a service entity (e.g., an emergency service entity, a towing services entity, a vehicle repair services entity, a home repair services entity, a vehicle salvage entity, and/or a taxi or ride-share services entity) to perform a service (e.g., dispatch an ambulance or a tow truck to a location of the vehicle, schedule an appointment for fixing the vehicle, schedule an appointment for fixing the home schedule an appointment to salvage the vehicle, and/or dispatch a taxi or ride-share service to a location of the vehicle respectively). The node 120 may use the telematics data or other data included in one or more transactions to communicate with the service entity.

As illustrated in FIG. 1A, the node 120 may include a blockchain manager 150. The blockchain manager 150 may be a software program, engine, and/or a module that is executed by one or more processors interconnected within the node 120 and configured to (i) compile one or more transactions (e.g., home transactions 107, vehicle transactions 108, entity transactions 109, and/or the like) into blocks; (ii) update a blockchain 160 to include the blocks; (iii) route the transactions to applicable smart contracts; and/or (iv) automatically execute the smart contracts if the transactions meet certain conditions defined by the smart contracts. In some embodiments, the blockchain manager 150 may (i) receive and compile one or more transactions into a block; (ii) update blockchain 160 to include the block; (iii) route one or more transactions (or data thereof) to a smart contract deployed onto the blockchain 160 that corresponds to a specific parametric event indicated by or otherwise associated with the one or more transactions; and/or (iv) automatically execute the smart contract.

According to some embodiments, an administrator of the node 120 may interact with a management interface 124 to interface with the blockchain 160 and/or set control parameters associated with the blockchain manager 150. For example, a period for which blocks are generated may be set via the management interface 124. In some embodiments, the administrator of the node 120 may also interact with the management interface 124 to control embodiments of the smart contract generator 122, e.g., by editing, adding, or deleting elements or parameters used by the smart contract generator 122 to generate smart contracts. Although FIG. 1A depicts the database 140 as a part of the node 120, the database 140 may be maintained within the blockchain 160.

The communication networks 110 may facilitate any data communication between/among the home 103, vehicle 105, entities 112, and/or node 120 via any standard or technology (e.g., GSM, CDMA, TDMA, WCDMA, LTE, EDGE, OFDM, GPRS, EV-DO, UWB, IEEE 802 including Ethernet, WiMAX, and/or others). According to some embodiments, the home 103, vehicle 105, and/or entities 112 may transmit generated transactions to the node 120 via the communication networks 110.

It should be appreciated that although the node 120 and entities 112 are shown as separate entities, in some embodiments, any one or more of the entities 112 may be, or otherwise include functionality of, the node 120. For example, the insurer entity may include or be communicatively coupled to databases 130, 140, smart contract generator 122, blockchain manager 150, and management interface 124.

Although FIG. 1A illustrates a single node 120, a single home 103, a single vehicle 105, and several components, it should be appreciated that more or less servers, homes, vehicles, and components may be contemplated. In some embodiments, the node 120 may be one or more interconnected servers, for example, in a cloud computing environment. The exemplary computing system 100 may include additional, fewer, or alternate equipment or components, including those discussed elsewhere herein.

Figure 1B:
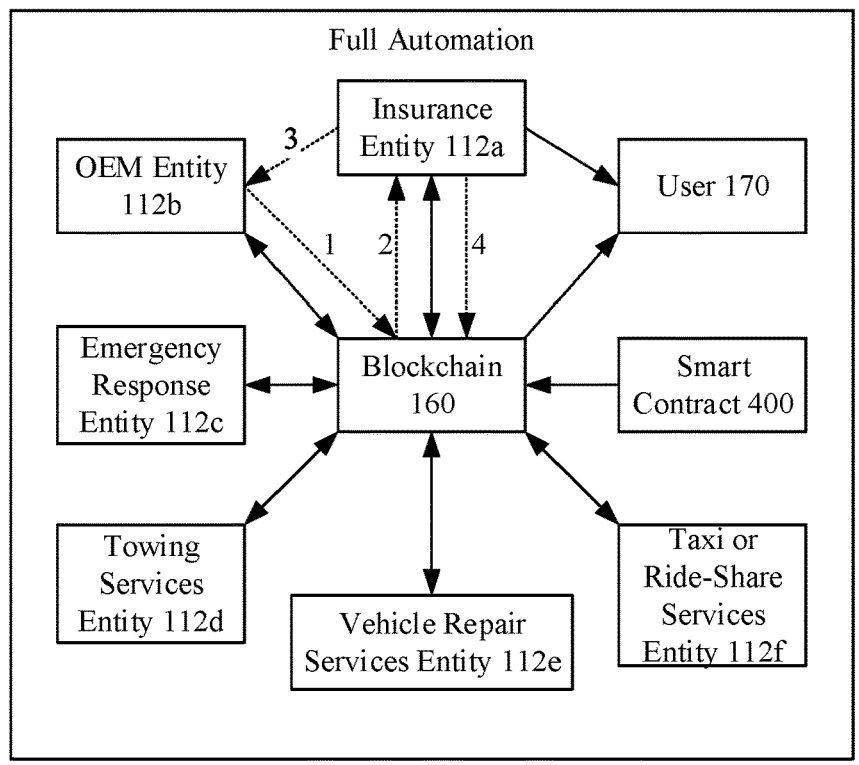
FIG. 1B depicts an exemplary network of computing systems including components and apparatuses associated with creating, deploying, and utilizing smart contracts on a blockchain, in accordance with some embodiments.
Figure 1C:
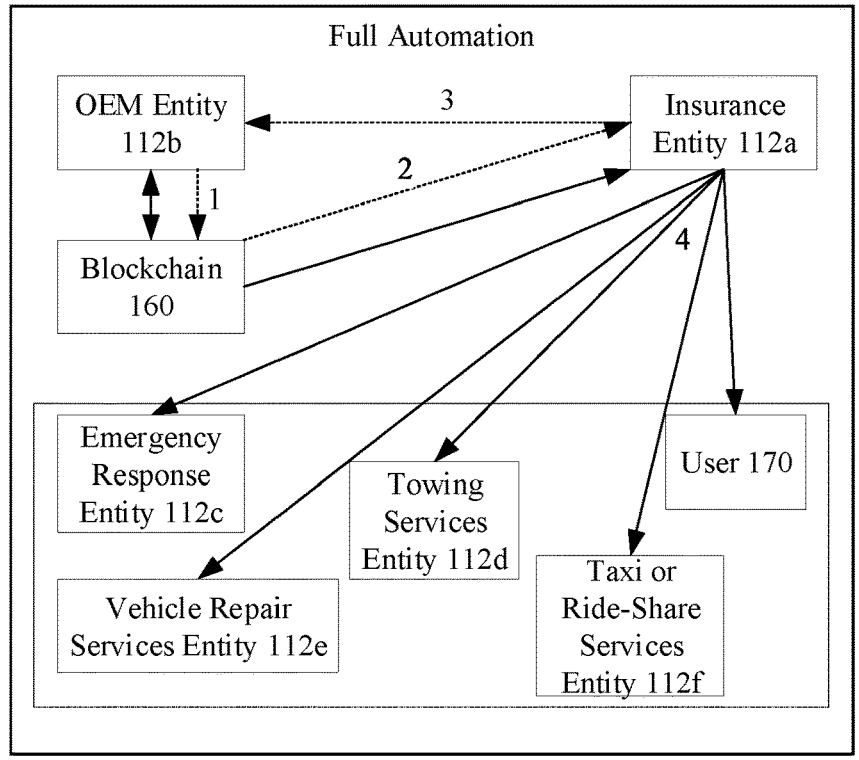
FIG. 1C depicts an exemplary network of computing systems including components and apparatuses associated with creating, deploying, and utilizing smart contracts on a blockchain, in accordance with some embodiments.

FIG. 1B and FIG. 1C each depict an exemplary network of computing systems including components and apparatuses associated with creating, deploying, and utilizing smart contracts on a blockchain in relation to a notice of loss. In particular, FIG. 1B depicts a network that is fully automated (e.g., the response to a triggering event is fully coordinated by a smart contract), whereas FIG. 1C depicts a network that is partially automated (e.g., the response to the triggering is coordinated by a particular node via off-chain communication). Although FIG. 1B and FIG. 1C depict certain entities, components, and devices, it should be appreciated that additional or alternate entities and components are envisioned.

As illustrated in FIGS. 1B, the network of computing systems may include a blockchain 160. One or more entities 112 (e.g., an insurance entity 112a, an OEM entity 112b (e.g., the electronic device 102 of the home 103 and/or vehicle 105), a DMV entity (not shown), an emergency response entity 112c, towing services entity 112d, home repair services entity (not shown), vehicle repair services entity 112e, vehicle salvage entity for servicing (not shown), a taxi or ride-share services entity 112f, and/or the like) and/or a customer 170 who owns and/or resides in the home 103 and/or operates the vehicle 105 may be associated with nodes of the blockchain 160. Additionally and/or alternatively, the nodes may receive updates to the blockchain 160 and/or deploy smart contracts to the blockchain 160.

In operation, the node of the OEM entity 112b may publish (1) an event to the blockchain 160 (e.g., by including the event in a transaction). The node of the OEM entity 112b may publish the event in response to a triggering event (e.g., a sensor collected new data, a safety feature was activated, etc.) via a consensus mechanism of the blockchain 160. For example, one type of event may be a Loss Event. As the loss becomes a claim and begins to move through the process, other events may include Claim Created Event, Emergency Services Required Event, Towing Required Event, Rideshare Requested Event, Repair Requested Event, etc.

In response to detecting the event, a node of the insurance entity 112a may detect (2) that the event has been published to the blockchain 160. Accordingly, the node of the insurance entity 112a may request (3) additional data from the home 103 and/or vehicle 105 to regarding data associated with the event. In some embodiments, the node of the insurance entity 112a may request the additional information utilizing the decentralized identity techniques to ensure that access to the triggering event data is provided only to authorized entities. If the node of the OEM entity 112b authorizes the node of the insurance entity 112a to access the triggering event data, the node of the OEM entity 112b may transmit the requested data to the node of the insurance entity 112a.

Based upon the requested triggering event data, the node of the insurance entity 112a may generate and deploy a smart contract onto the blockchain 160 to imitate (4) an automated workflow that is to be performed. For example, the workflow may include component actions to generate an insurance premium and/or to respond to a notice of loss event. In some other embodiments, the smart contract was already generated and deployed onto the blockchain 160 prior to the transaction being published to the blockchain 160 at (1).

In some embodiments, the automated workflow of the smart contract includes dispatching police, fire fighters, and/or an ambulance. Accordingly, the node corresponding to an emergency response entity 112c may detect that a triggering condition of the smart contract has been satisfied and dispatch the appropriate first responders accordingly. As another example, the automated workflow of the smart contract may direct the node of the insurance entity 112a to initiate an instantaneous notice of loss process associated the home 103 and/or vehicle 105. As another example, the automated workflow of the smart contract may direct the node of the tow truck entity 112d to dispatch a tow truck. As another example, the automated workflow of the smart contract may direct the node of the home repair services entity (not shown) to schedule home repair services for the home 105 upon receiving details of the parametric event. As another example, the automated workflow of the smart contract may direct the node of the vehicle repair services entity 112e to schedule vehicle repair services for the vehicle 105 upon receiving details of the parametric event. As another example, the automated workflow of the smart contract may direct the node of a vehicle salvage entity (not shown) to dispatch a salvage vehicle. As another example, the automated workflow of the smart contract may direct the node of a taxi or ride-share services entity 112f to dispatch taxi or ride-share services to the vehicle 105.

Turning now to the partially automated blockchain network illustrated in FIGS. 1C, the computing device associated with the customer 170 and/or the entities 112b-e are no longer nodes of the blockchain 160. Accordingly, while the node of the insurance entity 112a may still detect transactions and obtain the event data in a similar manner as described with respect to steps (1)-(3) of FIG. 1B, the node of the insurance entity 112b may instead coordinate the response via off-chain coordination techniques. That is, the node of the insurance entity 112b may communicate directly with the emergency services entity 112c to dispatch an emergency vehicle, the towing service entity 112d to dispatch a tow truck, the home repair services entity (not shown) and/or the vehicle repair services entity 112e to schedule a repair, and/or with the customer 170 to initiate notice of loss processing. In some embodiments, the node of the insurance entity 112a still performs the direct communications with the entities 112b-e and/or the customer 170 at the direction of a smart contract deployed to the blockchain 160.

Although FIG. 1B and FIG. 1C illustrate a single blockchain 160 and entities 112a-e, it should be appreciated that more or less, entities, vehicles, and components may be contemplated. In some embodiments, the blockchain 160 may be one or more interconnected blockchains (e.g., in the instance of two competing networks of entities). The exemplary network of computing systems may include additional, fewer, or alternate equipment or components, including those discussed elsewhere herein.

Exemplary Signal Diagrams

Figure 2A:
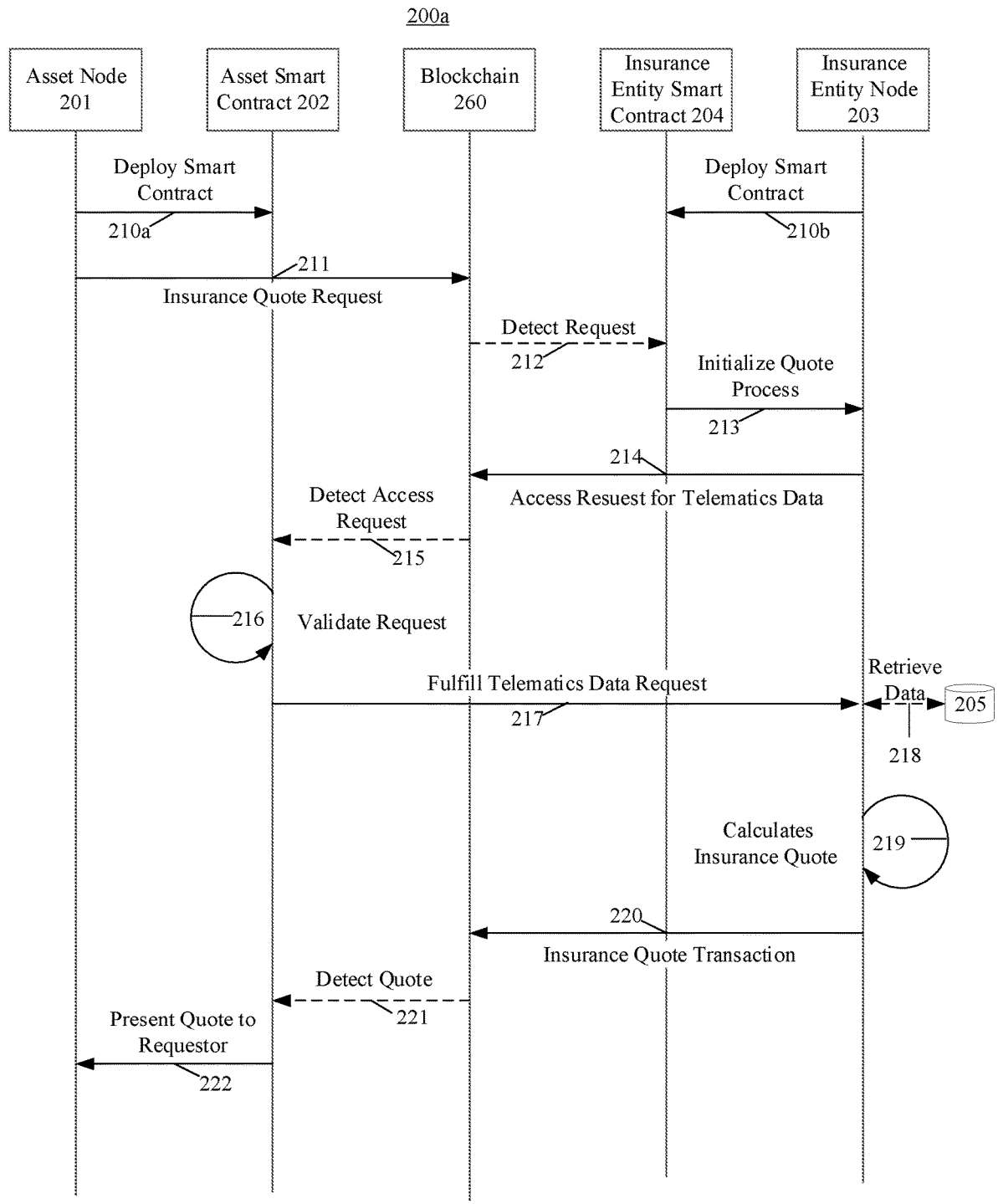
FIG. 2A depicts an exemplary signal diagram for implementing data portability on a blockchain in accordance with some embodiments.
Figure 2B:
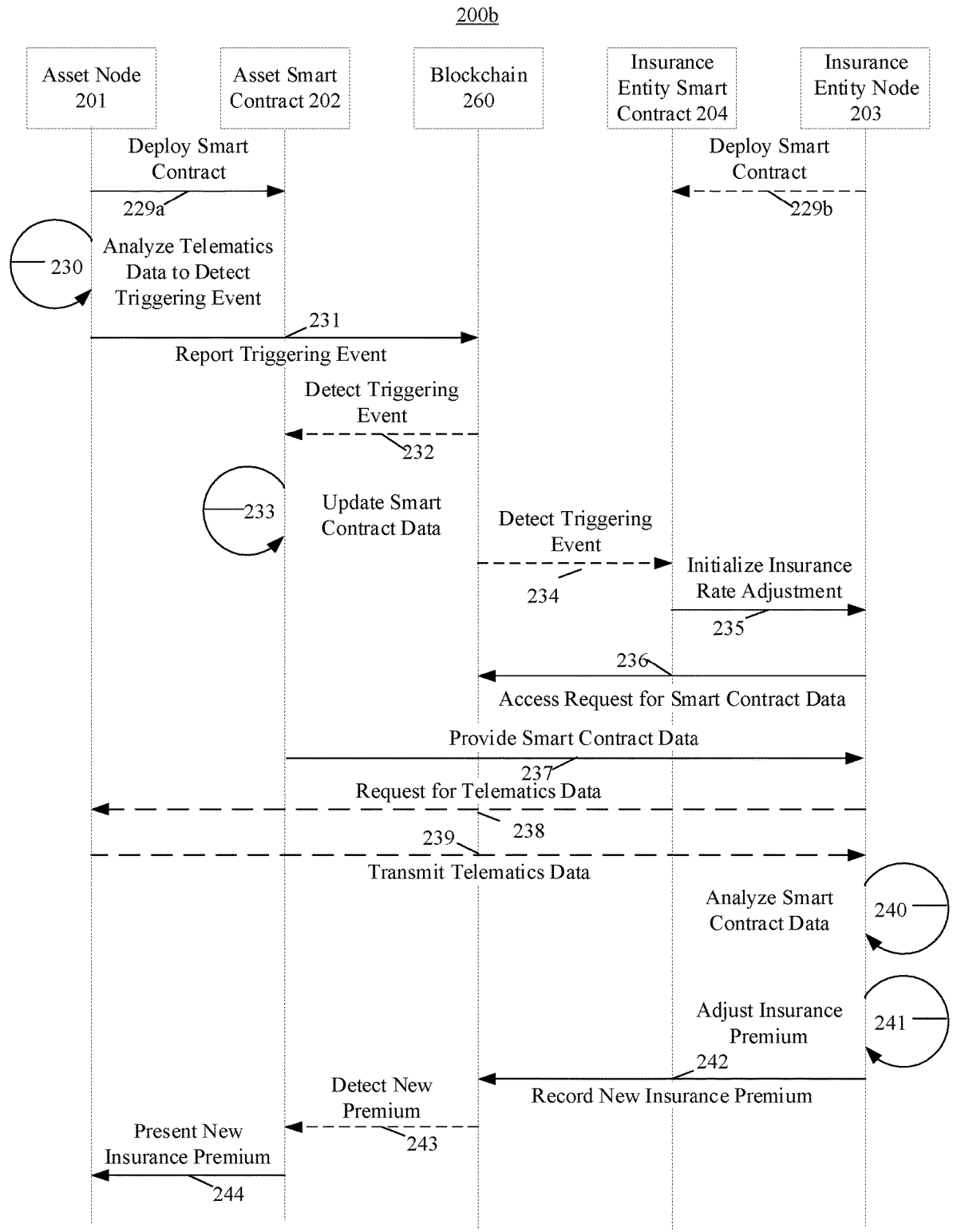
FIG. 2B depicts an exemplary signal diagram for updating an insurance premium based upon telematics data associated with a blockchain in accordance with some embodiments.

FIGS. 2A and 2B depict exemplary signal diagrams 200a and 200b for implementing data portability on a blockchain 260 (such as the blockchain 160 of FIG. 1A) and for updating an insurance premium based upon telematics data associated with the blockchain 260, respectfully. As illustrated, the signal diagrams 200a and 200b include an asset node 201 (such as a node associated with the home 103 and/or vehicle 105 of FIG. 1A), an asset smart contract 202, an insurance entity node 203 (such as a node associated with the insurance entity 112a of FIGS. 1B and 1C), and an insurance entity smart contract 204.

The asset node 201 may deploy (210a) the asset smart contract 202 to the blockchain 260 to control access to the telematics data associated with the corresponding asset. As described in FIG. 1A, the asset node 201 may be associated with an asset record on the blockchain 260 (e.g., blockchain 160) that indicates a location at which telematics data generated by the corresponding asset is maintained. Accordingly, by configuring the asset smart contract 202, the asset node 201 may be able to control which entities are able to access the telematics data and the manner in which the telematics data is utilized. For example, the asset node 201 may want to provide telematics data access to an insurer to receive a quote for a telematics-based insurance product. Additionally, the insurance entity node 203 may deploy (210b) the insurance entity smart contract 204 to the blockchain 260 to fulfill quote requests and/or generate insurance premiums.

As illustrated, the signal diagram 200a may begin when the asset node 201 requests (211) an insurance quote by writing a request event and/or transaction to the blockchain 260. The request may be configured to include an indication of the asset smart contract 202 via which the telematics data may be accessed and/or an indication of an entity to act upon the request. For example, the request may indicate that a particular insurer is to generate the insurance quote by including a blockchain identifier associated with insurance entity node 203 or that any insurer that is a participant in the blockchain 260 is to generate the insurance quote by including indicating a node type (e.g., insurance entities).

In some embodiments, the request for the insurance quote also updates the asset smart contract 202. In particular, the asset smart contract 202 may include a set of permissions associated with the telematics data generated by the corresponding asset. Accordingly, the request may update the asset smart contract 202 to change the access permissions such that the insurance entity indicated in the issued request are able to access the telematics to generate the requested quote. In some embodiments, the access permission may be granted for only a predetermined amount of time (such as one hour, four hours, a day, and so on).

The insurance entity smart contract 204 may detect (212) the request upon its inclusion in the blockchain 260. In response, the insurance entity smart contract 204 may self-execute on the nodes of the blockchain 260 to initialize (213) an insurance premium estimation process at the insurance entity node 203. For example, the insurance entity smart contract 204 may generate an access credential (e.g., a shared secret, an encryption key, randomly-generated pass key, etc.) to be provided by the insurance entity node 203 when requesting access to the telematics data. In some embodiments, the access credential may be encrypted using a public encryption key of the insurance entity node 203 to securely provide the access credential to the insurance entity node 203.

After obtaining the access credential, the insurance entity node 203 may submit a request to access the telematics data associated with the asset node 201. In the illustrated embodiment, the asset smart contract 202 may act as a data broker to the telematics data associated with the corresponding asset. That is, the asset smart contract 202 may detect a data request, obtain the requested data, and provide the requested data to the requestor. Accordingly, in the illustrated embodiment, the insurance entity node 203 may write the request to the blockchain 260 as an event and/or transaction.

In other embodiments, a separate data broker entity (such as a server, the asset node 201, or other computing entity) may be configured to maintain data privacy to the telematics data. For example, the asset smart contract 202 may be configured to update the data broker with updated sets of access rights in response to the insurance quote request at (211). Accordingly, in these alternate embodiments, the insurance entity node 203 may communicate the request to the data broker entity.

Regardless, in the illustrated embodiment, the insurance entity node 203 may write an access request event (214) and/or transaction to the blockchain 260. The request may be configured to include an indication of the asset smart contract 202 via which the telematics data may be accessed and/or an indication of an entity to act upon the request (such as a data broker entity). Additionally, the request may include a blockchain identifier and/or other identifier associated with insurance entity node 203 used to validate the authenticity of the request. For example, the identifier may include a digital signature that includes data encrypted by a private key of a public/private key pair associated with the insurance entity node 203. In one embodiment, the encrypted data in the signature may be the access credential (e.g., a randomly-generated passkey).

The asset smart contract 202 may detect (215) the request upon its inclusion in the blockchain 260. In response, the asset smart contract 202 may self-execute on the nodes of the blockchain 260 to validate (216) the request. In one example, the asset smart contract 202 validates the access rights assigned to the insurance entity node 203 to confirm the insurance entity node 203 may be permitted to access the requested data. In another example, the asset smart contract 202 may validate the access credential generated by the insurance entity smart contract 204. In embodiments where the digital signature includes a passkey, the validation may include applying the public key of the public/private key pair associated with the insurance entity node 203 to decrypt the digital signature thereby revealing the passkey.

Upon validation of the request, the asset smart contract 202 may fulfill (217) the request to the insurance entity node 203. In some embodiments, the asset smart contract 202 may fulfill the data request by obtaining the requested telematics data associated with the asset node 201 from a location of the requested telematics data 205 and providing the obtained data to the insurance entity node for processing. In some other embodiments, the access smart contract 202 may facilitate a secure connection between the telematics data location 205 and the insurance entity node 203 and/or the insurance entity smart contract 204. The secure connection may enable the insurance entity node 203 and/or the insurance entity smart contract 204 to execute one or more jobs that act upon the telematics data, for example, to generate a score or other metric upon which an insurance premium may be calculated. Additionally or alternatively, the asset smart contract 202 may fulfill the request by providing the insurance entity smart contract 204 and/or the insurance entity node 203 a decryption key to decrypt the requested telematics data. Once the insurance entity node 203 has retrieved (218) the historical telematics data, the insurance entity node 203 may calculate the insurance quote of the asset (219) based upon the retrieved telematics data. The insurance entity node 203 may then transmit the insurance quote to the asset node 201. In some embodiments, the insurance entity node 203 may transmit the insurance quote by writing (220) a transaction. In these embodiments, the asset smart contract 202 may detect (221) the quote transaction and provide (222) an indication of the insurance quote to the asset node 201. In some other embodiments, the insurance entity node 203 may transmit the insurance quote through a direct connection to the asset node 201.

Turning now to FIG. 2B, illustrated is an example signal diagram 200b for updating an insurance premium based upon telematics data associated with an asset smart contract. It should be appreciated that while both FIGS. 2A and 2B refer to the asset smart contract 202 and the insurance entity smart contract 204, in other embodiments, separate asset smart contracts and/or insurance entity smart contracts may be deployed to the blockchain 260 to facilitate telematics data portability and insurance premium updates.

As illustrated, the signal diagram 200b begins when the asset node 201 may deploy (229a) the asset smart contract 202 to the blockchain 260 to control manage telematics data associated with the asset node 201. As one example, the asset smart contract 202 may be configured to control access to the telematics data associated with the asset. As another example, the asset smart contract 202 may be configured to maintain a set of indications detailing operation of the asset based upon the corresponding telematics data. In one embodiment, the maintained set of indications relate to the activation of safety features associated with the asset. Additionally, the insurance entity node 203 may deploy (229b) the insurance entity smart contract 204 to the blockchain 260 to update an insurance policy associated with the asset node 201 based upon the telematics data generated by the corresponding asset.

The asset node 201 may then analyze the telematics data associated with the corresponding asset to detect (230) that a triggering event associated with the asset occurred. For example, the asset node 201 may detect an indication of a sensor triggering, an indication of a sensor not triggering when it was expected to trigger, an indication of a safety feature activating, an indication of a safety feature not activating when it was expected to activate, a parametric event, an indication of an acceleration, braking, and/or cornering event, and/or the like.

In response to the triggering event, the asset node 201 may report that the triggering event (231) by writing a transaction to the blockchain 260. In some embodiments, the transaction includes an indication of the triggering event. For example, an event indicative of an adaptive cruise control activating may appear in an event log as "cruiseControlON." Additionally, the asset node 201 may record the underlying telematics data to a data store associated with the asset record.

In response, the asset smart contract 202 may detect (232) the event in the transaction and self-execute on the nodes of the blockchain 260 to update (233) data maintained at the asset smart contract 202. For example, the nodes may include an indication of the event in a set of indications associated with the asset smart contract 202.

As described elsewhere herein, a telematics-based insurance product related to the asset calculate a new premium at predetermined intervals. For example, the premium may be recalculated monthly, bi-weekly, and/or in response to the occurrence of an event (such as a loss event). Accordingly, the insurance entity smart contract 204 may be configured to utilize these predetermined intervals as triggering events for the calculation of an updated insurance premium.

Accordingly, the nodes executing the insurance entity smart contract 204 may be configured to detect (234) the occurrence of premium recalculation triggering event. For example, the nodes may detect that a temporal condition has occurred based upon a global time of the blockchain 260. As another example, the nodes may detect an event-based triggering event in response to the asset node 201 writing an event and/or transaction to the blockchain 260, such as step (231).

In response to detecting the triggering event, the insurance entity smart contract 204 may direct the insurance entity node 203 to initialize (235) an adjustment of the insurance premium for a telematics-based insurance product associated with the asset. As described herein, the adjustment may be based upon actual operation of the asset since a prior insurance premium was calculated. Accordingly, the insurance entity node 203 obtain the corresponding telematics and/or event data to calculate the updated insurance premium.

In some embodiments, the insurance entity node 204 may write (236) an access request event and/or transaction to the blockchain 260 requesting access to the smart contract data associated with the asset. In some embodiments, the smart contract data may be the set of indications maintained by the asset smart contract 202. Additionally or alternatively, the smart contract data may include the telematics data associated with the asset.

The nodes executing the asset smart contract 202 may detect and process the access request. Generally, the asset smart contract 202 may be configured to provide access rights to the insurance entity node 203 and/or the insurance entity smart contract 204 as part of enrollment in a telematics-based insurance product. Accordingly, the nodes may authenticate that the request is from the insurance entity node (such as by validating a digital signature applied to the request) and/or confirm the access rights indicated in the asset smart contract 202 permit the insurance entity node 203 to access the requested data.

Upon validating the access request, the nodes executing the asset smart contract 202 may provide (237) the requested smart contract data to the insurance entity node 203. For example, if the request is for the set of indications maintained at the asset smart contract 202, the smart contract 202 may permit the insurance entity 203 to obtain the set of indications. As another example, the request may be for telematics data maintained at the asset node 201. Accordingly, the insurance entity node 203 may request (238) the telematics data from the asset node 201. The asset node 201 may be configured to transmit (239) the requested telematics data to the insurance entity node 203.

After obtaining the requested smart contract data, the insurance entity node 203 may analyze (240) the smart contract data. For example, the insurance entity node 203 may analyze the smart contract data to determine a parametric event. As another example, the insurance entity node 203 may analyze the smart contract data to determine a responsibility score, an acceleration score, a braking score, a cornering score, etc. The insurance entity node 203 may then adjust (241) the insurance premium of the asset based upon the analysis of the smart contract data.

The insurance entity node 203 may transmit (242) the adjusted insurance premium to the asset node 201. In some embodiments, the insurance entity node 203 may transmit the insurance premium by writing a transaction to the blockchain 260. In these embodiments, the asset node smart contract 202 may detect (243) the transaction and/or event indicating the adjusted insurance premium and cause the asset node 201 to present (244) the adjusted insurance premium to the insured. Additionally or alternatively, the insurance entity node 203 may transmit the insurance premium through a direct connection to the asset node 201.

According to certain aspects, an insurer associated with the insurance entity node 203 may provide discounted insurance premiums in proportion to the amount and/or types of smart contract data shared by the asset owner. That is, the insurer may provide a first level of discount for access to event logs associated with vehicle safety features and a second level of discount for additional access to acceleration/braking/cornering telematics data. Accordingly, the asset smart contract 202 may be configured to provide the insurance entity node 203 access to only the smart contract data agreed upon by the asset owner. Moreover, the asset owner may be able to readily update the shared types of smart contract data by modifying the asset smart contract 202. In response, the asset smart contract 202 may write a corresponding event and/or transaction to the blockchain 260 that causes the insurance entity smart contract 204 to initiate an insurance premium adjustment process. In some embodiments, this event and/or transaction may be a triggering event detected at step (234) to initialize an insurance rate adjustment.

Although FIGS. 2A and 2B depict only certain embodiments of the interaction between the asset node 201, the asset smart contract 202, the insurance entity node 203, and the insurance entity smart contract 204, more or less nodes and/or smart contracts and methods and/or steps of interaction between them are contemplated. This disclosure is not limited to the depictions of FIG. 2A, FIG. 2B, or the description above.

Exemplary Transaction on a Blockchain

Figure 3:
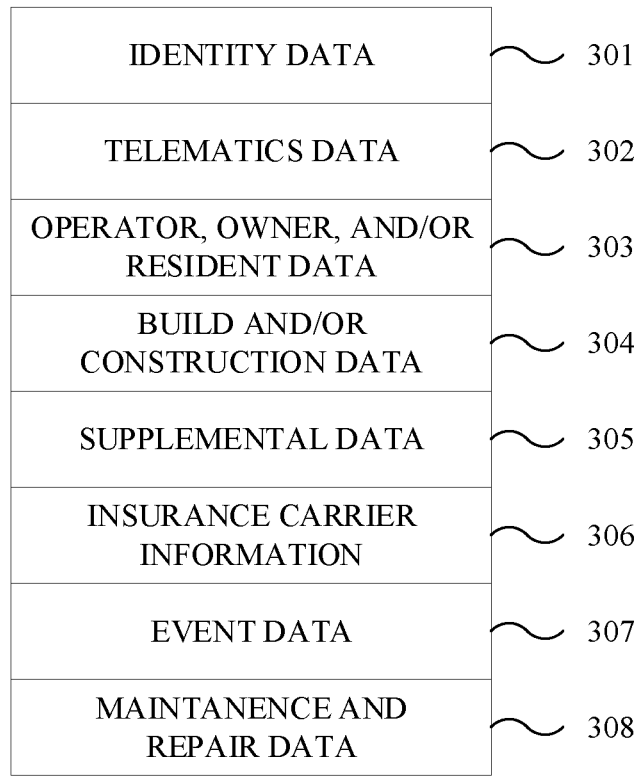
FIG. 3 depicts an exemplary transaction on a blockchain for generating and deploying smart contracts in accordance with some embodiments.

FIG. 3 depicts an exemplary transaction 300 (e.g., the home transaction 107 of FIG. 1A, the vehicle transaction 108 of FIG. 1A, the entity transaction 109 of FIG. 1A, and/or the like) recorded on a blockchain (e.g., the blockchain 160 of FIG. 1A) associated with a home 103 and/or a vehicle 105. An originating node (e.g., home 103 and/or vehicle 105, the sensors 101a-b, and/or the electronic device 102) of the transaction 300 may broadcast the transaction 300 to other nodes (e.g., the node 120, etc.) on the blockchain network. As described above, if the transaction 300 is approved via a consensus mechanism associated with the blockchain 160, the transaction 300 may be included in an update to the blockchain 160.

As illustrated, the transaction 300 may include data associated with a home 103 and/or a vehicle 105, such as data that corresponds to a parametric event defined by a smart contract 400 deployed on the blockchain 160. For example, the transaction 300 may include (1) identity data 301 (e.g., a VIN number, an address, a serial number of any one or more of sensors 101a-b and/or electronic device 102, a license plate number and/or the state of issuance, geographical coordinates, etc.); (2) telematics data 302 (e.g., sensor data indicative of driving, braking, speed, cornering, stopping/starting, acceleration, theft of items inside the vehicle, collisions, etc., and/or sensor data indicative of occupancy, electricity usage, water usage, theft of items inside the home, etc.); (3) operator, owner, and/or resident data 303 (e.g., name, user preferences, contact information, etc.); (4) build and/or construction data 304 (e.g., indications of vehicle and/or home features); (5) supplemental data 305 (e.g., third-party weather data, traffic data, image data, etc.) collected from the home 103, the vehicle 105, and/or other sources (e.g., mobile device sensor data, smart infrastructure sensor data, image data from cameras); (6) insurance carrier information 306 (e.g., insurer name, insurance policy ID or number, an indication of whether the policy remains in force, effective dates of the policy, expiration date of the insurance coverage, and/or insurance policy coverages, terms, limits, deductibles, conditions, etc.); (7) event data 307 (e.g., an indication of an event type, such as a parametric event ID); (8) maintenance and repair data 308; and/or (9) other data elements (not depicted), including those discussed elsewhere herein. It should be appreciated that while FIG. 2 illustrates a transaction 300 that includes each of data types 301-308, in other embodiments, the transactions may include any combination of the data types 301-308.

The identity data 301 may be used to route the transaction 300 to one or more smart contracts associated with the identity data 301. For vehicles 105, the identity data 301 may include a VIN number of the vehicle, a license plate number, state of issuance, decentralized identity (DID), etc. For homes 103, the identity data 301 may include an address, geographical coordinates, state information, county information, zip code, decentralized identity (DID), etc. Accordingly, the nodes of the blockchain 160 may utilize the identity data 301 to determine a location on the blockchain 160 at which smart contracts 400 associated with the identified home 103 and/or vehicle 105 may be stored. For example, the smart contracts 400 may be stored at a record associated with the identified home 103 and/or vehicle 105 and/or at a location generally associated with smart contract storage.

The telematics data 302 may include sensor data from a home 103 and/or vehicle 105, such as raw data from the one or more sensors, data log, date data, time data, geolocation data, etc. A node of the blockchain may process the telematics data 302 to identify the occurrence of events, such as the activation of a safety feature and/or that a parametric event occurred. In some embodiments, the node updates the record corresponding to the home 103 and/or vehicle 105 with the telematics data 302 (and/or indications derived therefrom). Additionally or alternatively, the node may store the telematics data 302 at an off-chain storage location and record an address (e.g., IP address) at which the telematics data 302 may be accessed to the record. In these embodiments, the node may also write a hash of the telematics data 302 to the record. As a result, when another party obtains the telematics data 302 from the indicated location, the party may execute the hashing algorithm on the obtained telematics data 302 to validate the source of the telematics data 302 by checking that the output hash value matches the hash value in the record.

The operator, owner, and/or resident data 303 in the transaction 300 may indicate an owner and/or resident of the home 103 and/or an operator of the vehicle 105 when the transaction 300 was generated. For example, the operator, owner, and/or resident data 303 may include a name, a driver's license number, contact information like address, phone, email address, etc. In some embodiments, the operator, owner, and/or resident data 303 may be utilized to obtain a set of access rights associated with data included in the transaction 300 and/or the record that corresponds to the home 103 and/or vehicle 105. To this end, the operator, owner, and/or resident may indicate that only particular entities may access particular types of data (e.g., that only a current insurer may access the telematics data 302). Accordingly, when an entity submits a request for data maintained at the record, the entity may generate a transaction that indicates the operator, owner, and/or resident data 203 such that a security node of the blockchain 160 may determine whether or not the requestor is authorized to access the requested data.

The build and/or construction data 304 may be included in a vehicle build sheet and/or a building blueprint and/or schematic included in the transaction 300 by a vehicle OEM and/or building constructor. For vehicles, the build and/or construction data may include vehicle make, vehicle model, vehicle year, vehicle specifications, optional vehicle features included in the particular vehicle 105*a*, and so on. For homes, the build and/or construction data may include year of construction, home specifications, option home features included in the particular home 103, and so on. As described herein, in some embodiments, a node may compare the telematics data 302 to the build and/or construction data 304 to verify the accuracy of the features listed in the vehicle build sheet and/or building blueprint and/or schematic. Additionally, a node generating an effectiveness score for a particular safety feature may utilize the build and/or construction data 304 to identify records having the particular safety feature.

The supplemental data 305 may include mobile device sensor data, infrastructure sensor data, vehicle sensor data, image data, weather data, traffic data, environmental conditions data, etc. In some embodiments, a node analyzes the supplemental data 305 to identify or confirm that a parametric event occurred. Additionally or alternatively, the node may analyze the supplemental data 305 to identify conditions that warrant the activation of a safety feature. For example, the supplemental data 305 may indicate the presence of rainy conditions and/or that the vehicle is being operated on a highway. As another example, the supplemental data 305 may indicate the presence of a home electricity monitor that measures electricity usage in the home.

The insurance carrier information 306 may include insurer name, insurance policy ID or number; an indication of whether the policy remains in force, effective dates of the policy, expiration date of the insurance coverage; and/or insurance policy coverages, terms, limits, deductibles, conditions, etc. The owner and/or resident of the home and/or the operator of the vehicle may generate a transaction that includes the insurance carrier information 306 to provide evidence of insurance by the home 103 and/or vehicle 105.

The event data 307 may indicate that an event has occurred. For example, the event data 307 may be a string indicating a name or parametric event ID associated with the occurrence of particular type of event. If the event data 307 is included in the transaction 300, a node may match the event data 307 with a smart contract using, for example, the identity data 301 and/or the operator, owner, and/or resident data 303. In embodiments where the event data is a smart contract triggering event, the smart contract may then self-execute to direct the node to perform one or more indicated actions. In other embodiments, the node may route a portion of the telematics data 302 associated with the event indication by the event data 307 to the smart contract to determine whether a triggering event occurred.

The maintenance and repair data 308 may include contact information of a maintenance and/or repair entity (such as a body shop, repair shop, construction company, etc.), records relating to the service of the home 103 and/or vehicle 105 (such as home repair estimates, vehicle repair estimates, home repair receipts, vehicle repair receipts, etc.), and/or the like. According, a node may be configured to update the asset record with the maintenance and repair data 308 to update a maintenance log stored thereat.

Exemplary Smart Contracts

Figure 4:
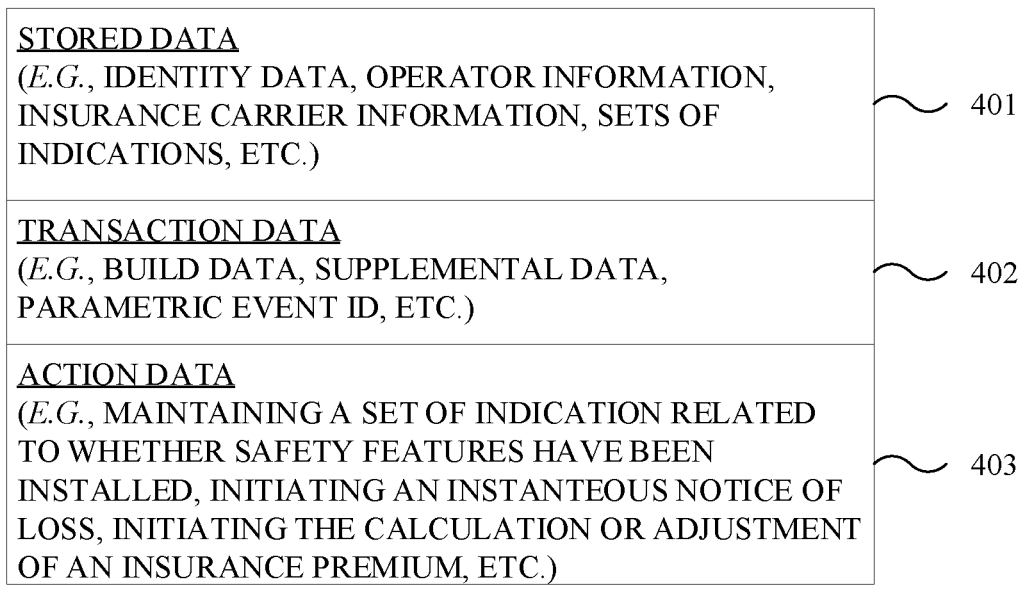
FIG. 4 depicts an exemplary smart contract in accordance with some embodiments.

FIG. 4 depicts an exemplary smart contract 400. As shown in FIG. 4, the smart contract 400 may include stored data 401 that the smart contract 400 gathers from either the blockchain 160 and/or transaction data 402 that the smart contract 400 receives from a transaction 300 and applies the stored data 401 and/or the transactional data 402 to action data 403 to enforce a certain action.

The stored data 401 may include identity data 301, telematics data 302, operator, owner, and/or resident information 303, build and/or construction data 304, supplemental data 305, insurance carrier information 306, event data 307, and/or maintenance and repair data 307. According to certain aspects, the stored data 401 may be queryable fields. Accordingly, when a node receives a transaction, such as the transaction 300 of FIG. 3, the node may utilize the transaction data 402 to identify relevant smart contracts 400. For example, when a node receives a transaction 300 including identity data 301 that designates the home 103 and/or vehicle 105, the node may generate a query that includes the identity data 301 to identify a location, such as a record corresponding to the home 103 and/or vehicle 105, at which the smart contract 200 may be stored.

Additionally, the stored data 401 may include indications associated with the ownership and/or residence of homes and/or operation of vehicles. For example, if the smart contract 400 governs a personalized insurance product, the stored data 401 may include indications of vehicle usage, operator scores, home usage (e.g., occupancy, water usage, electricity usage), and/or owner/resident scores upon which an insurance premium may be generated. For example, the stored data 401 may include a responsibility score, an effectiveness score, and/or any component scores thereof (e.g., an acceleration score, a braking score, a cornering score, an electricity usage score, a water usage score, a maintenance and/or repair score, etc.). As another example, the stored data 401 may include a set of indications related to the activation of safety features.

The transaction data 402 may include an analysis function that receives, as an input, data extracted from the transaction 300. Based upon the input data, the analysis function may set a flag used as a signal in the if-then conditional logic defined by the smart contract 400. For example, the analysis function may be code that may be configured to compare indications of vehicle safety features included in the telematics data 402 to safety features identified in the collective build sheet and/or building blueprints and/or schematics stored in the record to set a flag representative of whether or not the collective build sheet and/or building blueprints and/or schematics are accurate.

The action data 403 specifies a particular action to be performed by the node enforcing the smart contract based upon the output of the analysis function performed with respect to the transaction data 402. For example, if the analysis function sets a flag indicating that the collective build sheet and/or building blueprints and/or schematics are inaccurate, then the action data 403 may be code that, when executed by a node, updates the record with the correct build and/or construction data 304. As another example, if the analysis function may set a flag indicating that an insurance premium is to be generated, the action data 403 may be code that, when executed by a node, analyzes the stored data 401 to generate the insurance premium.

As another example, upon the analysis function setting a flag indicating the a loss occurred, the action data 403 may include code that, when executed by a node associated with an insurance entity (such as the insurance entity 112a of FIGS. 1B and 1C), (1) initiates an instantaneous notice of loss (e.g., populating an instantaneous notice of loss report with any of the extracted information included in the transaction); (2) determines coverage and policy conditions; (3) performs vehicle triage; (4) sends an assignment (e.g., including description of the home and/or vehicle, location of the home and/or vehicle, user preferences of the home owner and/or resident and/or the vehicle operator) to emergency response entity, towing services entity, home repair services entity, vehicle repair services entity, vehicle salvage entity for servicing, and/or taxi or ride-share services entity; (5) authorizes a rental vehicle if applicable; (6) resolves any prior issues; (7) sends an estimate and parts brochures to the vehicle operator; (8) performs a home inspection if and when required; (9) performs a vehicle inspection if and when required; and/or (10) pays the final repair and/or any rental bills.

As another example, upon the analysis function setting a flag indicating the a loss occurred, the action data 403 may include code that, when executed by a node associated with an emergency response entity (such as the emergency response entity 112c of FIG. 1B) (1) receives an assignment from insurer entity; (2) provides medical assistance to the owner and/or any residents of the home; (3) provides medical assistance to the operator and/or any occupants of the vehicle; (4) fills out a police report; (5) contacts a physician or hospital according to the user preferences of the vehicle operator; and/or (6) sends a medical bill to the insurer entity.

As another example, upon the analysis function setting a flag indicating the a loss occurred, the action data 403 may include code that, when executed by a node associated with a towing services entity (such as the towing services entity 112d of FIG. 1B), a home repair services entity, a vehicle repair services entity (such as the vehicle repair entity 112e of FIG. 1B), vehicle salvage entity, and/or taxi or ride-share services entity (such as the taxi or ride-share services entity 112f of FIG. 1B) (1) receives an assignment from insurer entity; (2) takes possession of vehicle; (3) arranges for rental/substitute transportation; (4) secures authorization to repair; (5) salvages the vehicle; (6) develops a repair plan; (7) prepares an estimate; (8) sends a listing of necessary parts to suppliers; (9) finalizes parts order and ordering parts; (10) upload an estimate; (11) checks delivered parts versus parts ordered; (12) repairs the vehicle; (13) provides a repair status updates to the vehicle operator; (14) delivers the vehicle; (15) provides the vehicle operator with a repair warranty; (16) sends a final repair bill to the insurer entity; and/or (17) performs other actions, including those discussed elsewhere herein.

Figure 5:
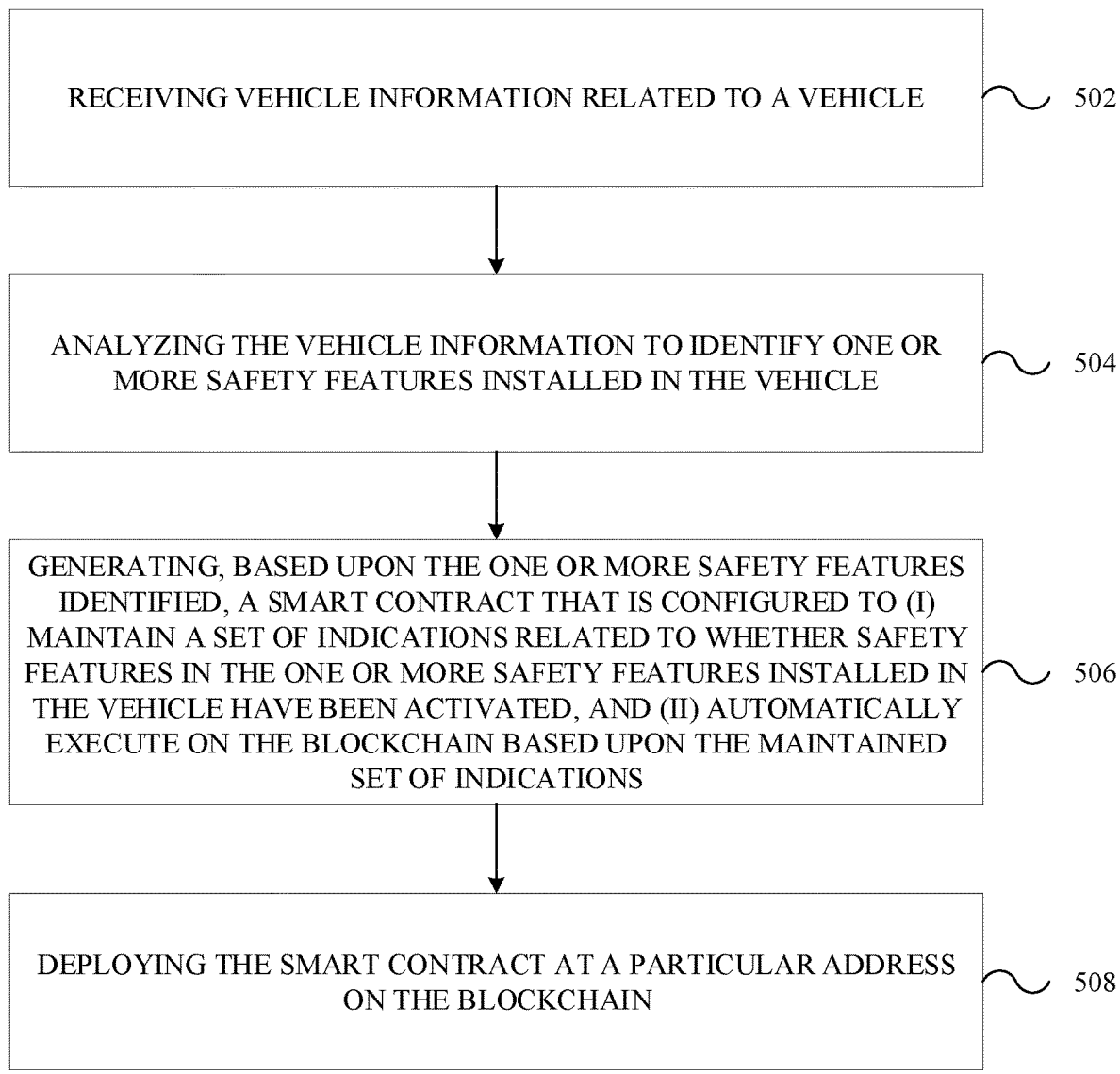
FIG. 5 depicts an exemplary computer-implemented method for generating smart contracts deployed onto a blockchain.

Exemplary Method of Generating Smart Contracts for Generating and Updating a Vehicle Build Sheet FIG. 5 depicts an exemplary computer-implemented method 500 for generating one or more smart contracts for deployment onto a blockchain (e.g., blockchain 160). The method 500 depicted in FIG. 5 may employ any of the blockchain techniques, methods, and systems described above with respect to FIGS. 1-4.

The method 500 may begin at block 502 by receiving, at one or more processors (e.g., of node 120, etc.), vehicle information related to a vehicle (e.g., vehicle 105). In some embodiments, the vehicle information (e.g., the vehicle sensor data) may be pushed by the vehicle to the one or more processors either in response to a triggering event (e.g., a safety feature was engaged or disengaged, a parametric event occurred, etc.) or after a set period of time has passed. Additionally or alternatively, the vehicle information may be pulled by the one or more processors from the vehicle either in response to a triggering event (e.g., a generation of a vehicle record, a report of a parametric event received, etc.) or after a set period of time has passed.

The method 500 may proceed to block 504 by analyzing, at one or more processors, the vehicle information to identify one or more safety features installed in the vehicle. In some embodiments, a triggering event may occur and be detected by the one or more processors. For example, the one or more processors may analyze the vehicle information to determine that one or more safety features are installed based upon the analysis of the vehicle information. The one or more processors may identify the one or more safety features by (i) analyzing the data of a sensor to determine the safety feature (if any) associated with that sensor, (ii) receive identifying information coupled to the data of the sensors, and/or (iii) receive an indication from the vehicle's bus that a sensor data triggered.

The method 500 may proceed to block 506 by generating, at one or more processors and based upon the one or more safety features identified, a smart contract that may be configured to (i) maintain a set of indications related to whether safety features in the one or more safety features installed in the vehicle have been activated, and (ii) automatically execute on the blockchain based upon the maintained set of indications. In some embodiments, the transaction may include vehicle sensor data generated from sensors mounted on or within a vehicle. In some embodiments, each of the generated smart contracts may define an action that is triggered when a triggering event occurs. For example, the action that is triggered may be one of the following: (1) generating, updating, and/or otherwise maintaining a vehicle build sheet with or by the one or more processors and/or with or by the smart contract, (2) initiating processes for calculating and/or adjusting one or more insurance premiums with or by the one or more processors and/or with or by the smart contract, (3) initiating processes for claiming a notice of loss (such as an instantaneous notice of loss or other first notice of loss) with or by the one or more processors and/or with or by the smart contract, (4) initiating processes for servicing the vehicle (e.g., communicating with the insurer entity (e.g., a car insurance company and/or the like), communicating with an emergency response entity (e.g., police, fire department, EMTs, and/or the like), communicating with a towing service entity (e.g., a towing company and/or the like), communicating with a vehicle repair service entity (e.g., a repair shop, a body shop, and/or the like), communicating with a vehicle salvage entity (e.g., a vehicle salvage company and/or the like), communicating with a taxi or ride-share service entity (e.g., a taxi company, a ride-share service company, and/or the like)), (5) causing one or more entities to exchange information about the vehicle with an operator of the vehicle (e.g., driver of the vehicle, owner of the vehicle, policy holder of the vehicle) or vice versa or with one or more other entities or operators of other vehicles, etc., and/or (6) additional actions, including those discussed elsewhere herein.

The method 500 may proceed to block 508 by deploying, by the one or more processors, the smart contract at a particular address on the blockchain. The method 500 may include additional, less, or alternate actions, including those discussed elsewhere herein.

Exemplary Method of Deriving an Insurance Premium Based Upon Telematics Data

Figure 6:
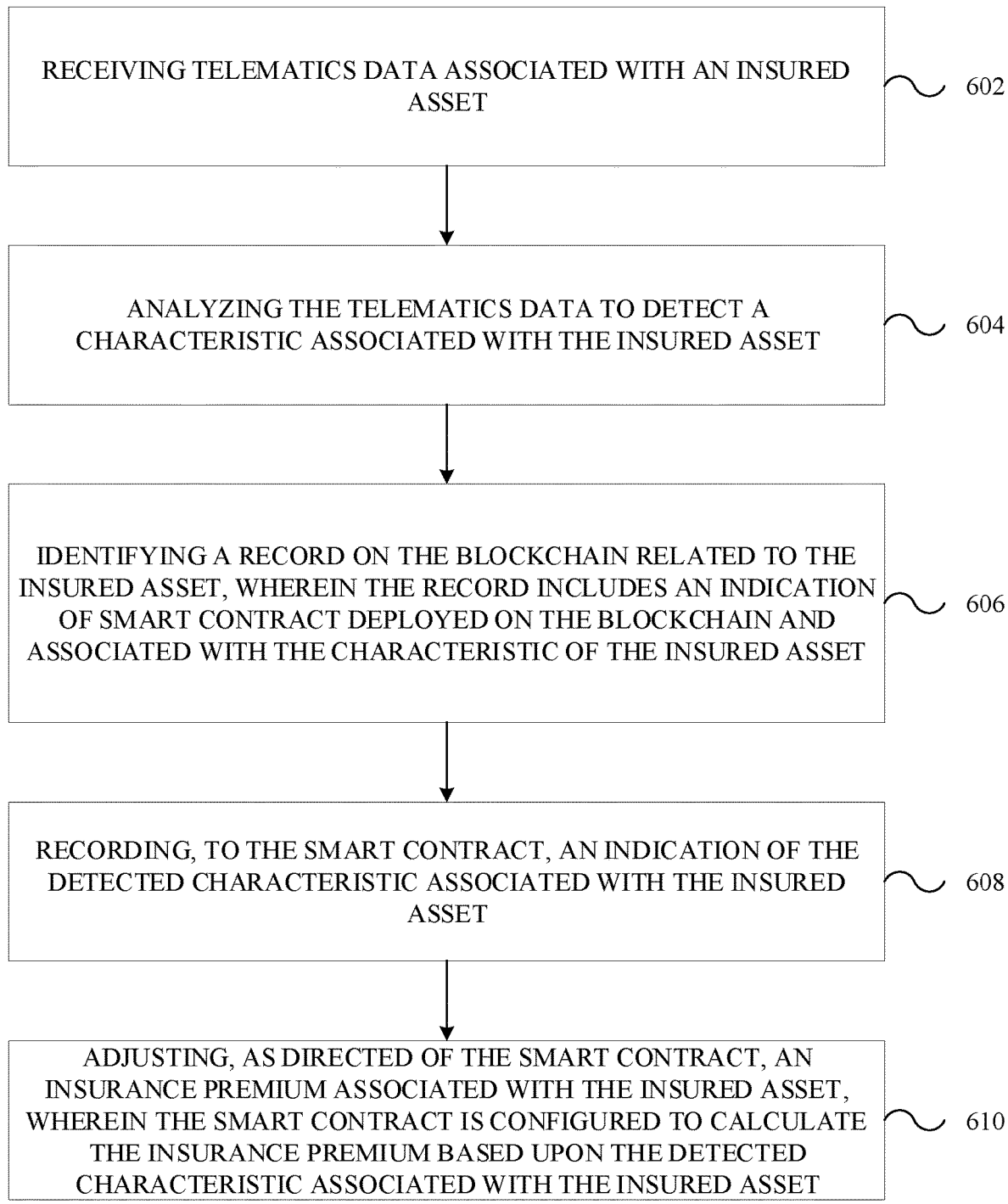
FIG. 6 depicts an exemplary computer-implemented method for calculating and/or adjusting an insurance premium based upon telematics data associated with a blockchain.

FIG. 6 depicts an exemplary computer-implemented method 600 for calculating an insurance premium using a blockchain (e.g., blockchain 160). The method 600 depicted in FIG. 6 may employ any of the blockchain techniques, methods, and systems described above with respect to FIGS. 1-5.

The method 600 may begin at block 602 by receiving, by one or more processors (e.g., of node 120, etc.), telematics data (e.g., sensor data) associated with an insured asset (e.g., a home 103 and/or vehicle 105). In some embodiments, the telematics may be pushed by the insured asset to the one or more processors either in response to a triggering event (e.g., a safety feature was engaged or disengaged, a parametric event occurred, etc.) or after a set period of time has passed. Additionally or alternatively, the telematics data may be pulled by the one or more processors from the insured asset either in response to a triggering event (e.g., a generation of a vehicle record, a report of a parametric event received, etc.) or after a set period of time has passed.

The method 600 may proceed to block 604 by analyzing, by the one or more processors, the telematics data to detect a characteristic associated with the insured asset. In some embodiments, a triggering event may occur and be detected by the one or more processors. For example, the one or more processors may analyze the telematics data to determine that one or more safety features are installed based upon the analysis of the telematics data. The one or more processors may identify the one or more safety features by (i) analyzing the data of a sensor to determine the safety feature (if any) associated with that sensor, (ii) receive identifying information coupled to the data of the sensors, and/or (iii) receive an indication from insured asset that a sensor data triggered.

The method 600 may proceed to block 606 by identifying, by the one or more processors, a record on the blockchain 160 related to the insured asset, wherein the record (e.g., an asset record) associated with the insured asset) includes an indication of smart contract 400 deployed on the blockchain 160 and associated with the characteristic of the insured asset.

The method 600 may proceed to block 608 by recording, to the smart contract 400, an indication of the detected characteristic associated with the insured asset.

The method 600 may proceed to block 610 by adjusting, as directed of the smart contract 400, an insurance premium associated with the insured asset, wherein the smart contract 400 is configured to calculate the insurance premium based upon the detected characteristic associated with the insured asset. The method 600 may include additional, less, or alternate actions, including those discussed elsewhere herein.

Exemplary Method of Deriving an Insurance Premium Based Upon Prior Driving Data

Figure 7:
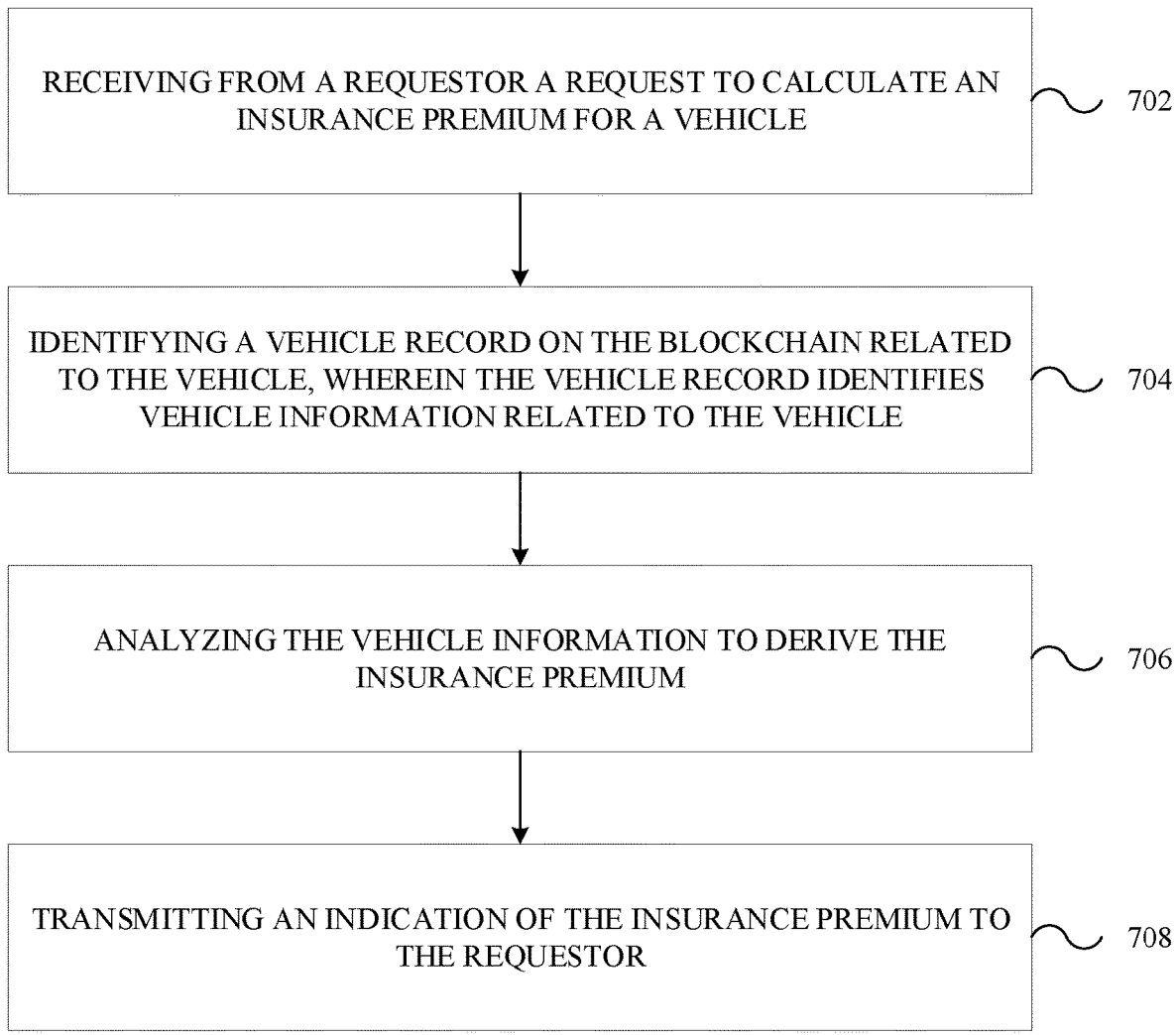
FIG. 7 depicts an exemplary computer-implemented method for calculating and/or adjusting an insurance premium based upon portable data associated with a blockchain.

FIG. 7 depicts an exemplary computer-implemented method 700 for data portability using a blockchain (e.g., blockchain 160). The method 700 depicted in FIG. 7 may employ any of the blockchain techniques, methods, and systems described above with respect to FIGS. 1-6.

The method 700 may begin at block 702 by receiving, at one or more processors (e.g., of node 120, etc.) from a requestor (e.g., asset node 201), a request to calculate an insurance premium for a vehicle (e.g., vehicle 105).

The method 700 may proceed to block 704 by identifying, by the one or more processors, a vehicle record on the blockchain related to the vehicle, wherein the vehicle record identifies vehicle information (e.g., vehicle sensor data) related to the vehicle. In some embodiments, the vehicle record may include a one or more vehicle build sheets, a collective build sheet, or portion of one or more vehicle build sheet, and/or a portion of a collective build sheet. In some embodiments, the vehicle may include identifying information (e.g., identity data) included in transactions to the blockchain. In some embodiments, the one or more processors may read the vehicle information to determine which vehicle record and/or smart contracts stored on the blockchain relate to the vehicle.

The method 700 may proceed to block 706 by analyzing, by the one or more processors, the vehicle information to derive the insurance premium. In some embodiments, the transaction may include vehicle sensor data generated from sensors mounted on or within a vehicle. In some embodiments, each of the generated smart contracts may define an action (e.g., calculate an insurance premium) that is triggered when triggering event occurs (e.g., a requestor requests for the insurance premium).

The method 700 may proceed to block 708 by transmitting, by the one or more processors, an indication of the insurance premium to the requestor. The method 700 may include additional, less, or alternate actions, including those discussed elsewhere herein.

Exemplary Method of Deriving an Insurance Premium Based Upon Historical Telematics Data FIG. 8 depicts an exemplary computer-implemented method 800 for data portability using a blockchain (e.g., blockchain 160). The method 800 depicted in FIG. 8 may employ any of the blockchain techniques, methods, and systems described above with respect to FIGS. 1-7.

The method 800 may begin at block 802 by receiving, by one or more processors (e.g., of node 120, etc.) and from a requestor (e.g., asset node 201), a request to calculate an insurance premium for an asset (e.g., a home 103 and/or vehicle 105) associated with a record (e.g., an asset record) on the blockchain, wherein the record includes an indication of a location at which historical telematics data associated with the insured asset is located. In some embodiments, the historical telematics data of an asset is stored off-chain with its location encrypted on-chain. When an insurance entity node (e.g., a node 120 associated with an insurance entity 112*a*) attempts to retrieve the historical telematics data, it will request access from the asset node.

The method 800 may proceed to block 804 by obtaining, by the one or more processors, the historical telematics data (e.g., sensor data) from the indicated location. In some embodiments, the one or more processors may retrieve the historical telematics data from the asset in response to a triggering event (e.g., a generation of an asset record, a report of a parametric event received, etc.) or after a set period of time has passed.

The method 800 may proceed to block 806 by analyzing, by the one or more processors, the historical telematics data to derive the insurance premium. In some embodiments, the historical telematics data may include sensor data generated from sensors mounted on or within the asset (e.g., a home 103 and/or vehicle 105). In some embodiments, each of the generated smart contracts may define an action (e.g., calculating an insurance premium) that is triggered when a triggering event occurs (e.g., a request for an insurance premium from the asset node).

The method 800 may proceed to block 808 by transmitting, by the one or more processors, an indication of the derived insurance premium to the requestor. The method 800 may include additional, less, or alternate actions, including those discussed elsewhere herein.

Figure 9:
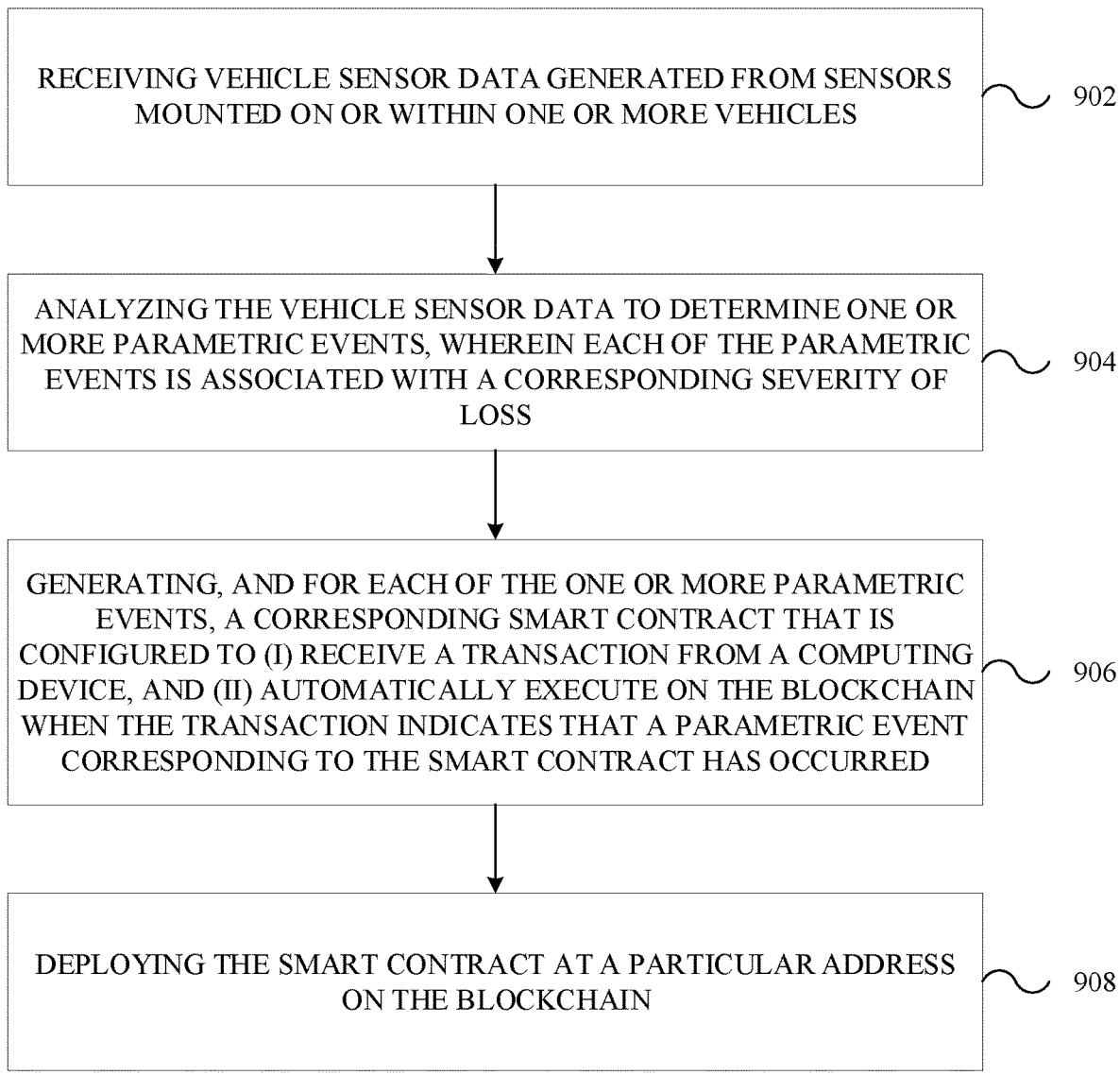
FIG. 9 depicts an exemplary computer-implemented method for generating smart contracts deployed onto a blockchain for initiating an instantaneous notice of loss.

Exemplary Method of Generating Smart Contracts for Respective Parametric Events Associated with Vehicle Loss FIG. 9 depicts an exemplary computer-implemented method 900 for generating one or more smart contracts for deployment onto a blockchain (e.g., blockchain 160). The method 900 depicted in FIG. 9 may employ any of the blockchain techniques, methods, and systems described above with respect to FIGS. 1-8.

The method 900 may begin at block 902 by receiving, at one or more processors (e.g., of node 120 or any one or more of the entities 112, vehicle sensor data generated from sensors (e.g., sensors 101*a-b*) mounted on or within one or more vehicles.

The method 900 may proceed to block 904 by analyzing, by the one or more processors, the vehicle sensor data to determine one or more parametric events, wherein each of the parametric events may be associated with a corresponding severity of loss. In some embodiments, a parametric event may be any one of theft involving a vehicle (corresponding to a "low" severity of loss), a collision involving the vehicle (corresponding to a "medium" severity of loss), or total loss of the vehicle (corresponding to a "high" severity of loss). However, generally speaking, a parametric event may relate to vehicle damage, and/or the extent or type of vehicle damage (or in other embodiments, a parametric event may relate to home damage, and/or the extent or type of home damage). In some embodiments, the one or more processors may receive supplemental data generated from one or more sources (e.g., smart infrastructure sensor, an electronic device located in one or more of the one or more vehicles, a camera located in an area in which the one or more vehicles are located, or a third-party server, such as a weather server) and analyze the supplemental data to determine the one or more parametric events.

The method 900 may proceed to block 906 by generating, by the one or more processors and for each of the one or more parametric events, a corresponding smart contract that may be configured to (i) receive a transaction from a computing device (e.g., any one or more of sensors 101*a-b* and/or electronic device 102) and (ii) automatically execute on the blockchain when the transaction indicates that a parametric event corresponding to the smart contract has occurred. In some embodiments, the transaction may include vehicle sensor data generated from sensors mounted on or within a vehicle (e.g., vehicle 105). In some embodiments, each of the generated smart contracts may define an action that is triggered when a triggering event occurs. For example, the action that is triggered may be one of the following: (1) generating, updating, and/or otherwise maintaining a vehicle build sheet with or by the one or more processors and/or with or by the smart contract, (2) initiating processes for calculating and/or adjusting one or more insurance premiums with or by the one or more processors and/or with or by the smart contract, (3) initiating processes for claiming a notice of loss (such as an instantaneous notice of loss or other first notice of loss) with or by the one or more processors and/or with or by the smart contract, (4) initiating processes for servicing the vehicle (e.g., communicating with the insurer entity (e.g., a car insurance company and/or the like), communicating with an emergency response entity (e.g., police, fire department, EMTs, and/or the like), communicating with a towing service entity (e.g., a towing company and/or the like), communicating with a vehicle repair service entity (e.g., a repair shop, a body shop, and/or the like), communicating with a vehicle salvage entity (e.g., a vehicle salvage company and/or the like), communicating with a taxi or ride-share service entity (e.g., a taxi company, a ride-share service company, and/or the like)), (5) causing one or more entities to exchange information about the vehicle with an operator of the vehicle (e.g., driver of the vehicle, owner of the vehicle, policy holder of the vehicle) or vice versa or with one or more other entities or operators of other vehicles, etc., and/or (6) additional actions, including those discussed elsewhere herein.

The method 900 may proceed to block 908 by deploying, by the one or more processors, the smart contract at a particular address on the blockchain. The method 900 may include additional, less, or alternate actions, including those discussed elsewhere herein.

Additional Exemplary Embodiments

The present embodiments may relate to, inter alia, blockchains associated with calculating and/or adjusting an insurance premium based upon recorded telematics data. For instance, telematics data (e.g., sensor data from a home and/or vehicle, a data log of one or more sensors attached on or in the home and/or vehicle, raw data from the one or more sensors, date data, time data, geolocation data, etc.) may be collected from smart vehicles, smart homes, or mobile devices having applications that collect telematics data during use. The present embodiments may employ one or more local or remote processors to assess telematics data (including home sensor data and/or vehicle sensor data), data reliability, and/or validate to determine an event (e.g., a safety feature's activation, a vehicle crash or collision, etc.). The telematics data may also be further analyzed by the local or remote processors (for example, in the case of a car collision, the one or more processors may determine if a damaged vehicle is a total loss, salvageable, or repairable). The telematics data may be used to determine which sensors, vehicle parts, and/or home areas are accurate and/or effective or defective, broken, or otherwise in need of repair or replacement.

The telematics data from before, during, and/or after the event may also be collected and analyzed by one or more processors to determine which technologies or systems (such as autonomous vehicle technologies or systems, or advanced safety systems) operated correctly, or deficiently and contributed, at least in part, to the event (for example, in the case of a collision, determine whether any safety features failed, or, in the case of monitoring safety features during their normal course of operation, determine whether a safety feature, like autonomous cruise control of a vehicle was engaged, but for one reason or another did not actually activate). The sensor data associated with the event may be analyzed and/or transmitted to other entities for further processing and/or the provision of services (for example, the sensor data may be sent to tow trucks or first responders, such as police or ambulances, such as to facilitate first responders with performing mitigating actions that mitigate further injuries due to the vehicle collision and/or property damage). The telematics data associated with the event may also be analyzed by smart techniques (e.g., machine learning, deep learning, etc.) to determine aspects of the event or make predictions (for example a machine learning algorithm may determine, based upon the provided sensor data, the severity and amount of injuries, and/or if ambulances are required).

As an example, one use of machine learning may be the prediction (such as by using machine learning techniques or other pattern recognition techniques) that the operator of a vehicle and/or the owner and/or resident of a home will not use a safety feature based upon the telematics data (including vehicle sensor data) of the operator owner, and/or resident's past nonuse of the safety feature in similar circumstances and then recommending the safety feature's enablement and activation (again, for instance, such as by using machine learning techniques or applying other pattern recognition techniques on the data collected).

As another example, another use of machine learning may be the detection of a collision from processor analysis (such as by using machine learning techniques or other pattern recognition techniques) of telematics data and/or other data (including sensor data), as well as processor analysis of electronic device, smart infrastructure, and/or third-party data (again, for instance, such as by using machine learning techniques or applying other pattern recognition techniques on the data collected).

After a triggering event is detected, the telematics data and/or other data generated or collected may be analyzed by one or more remote or local processors for other triggering events (for instance, such as by using machine learning techniques or other pattern recognition techniques on the data collected). For instance, once the enablement and/or activation of a safety feature is detected, the telematics data (along with all other data collected from the home and/or vehicle) may be further analyzed and processed to determine that a collision occurred (e.g., as determined from machine learning models or pattern machine techniques from the acceleration data, braking data, pressure sensor data, etc.).

Based upon analysis of the telematics data and/or other data collected (such as by using machine learning techniques or applying other pattern recognition techniques on the data collected), the system may recommend and/or perform any number of actions autonomously and automatically. For example, in the case of a collision or other form of property damage, the system may, based upon the severity of the collision and other data related to the damage, decide to (1) initiate, handle, and/or process an auto insurance claim; (2) contact a tow vehicle, such as transmitting the damaged home and/or vehicle's location and owner information to the tow vehicle or to a towing service; (3) contact emergency services, such as transmitting the damaged home and/or vehicle's location, the number of injured persons, and the severity of the injuries to a nearby ambulance, hospital, or police station; (4) identify the necessary parts to repair the damaged home and/or vehicle, and transmitting information detailing the damaged home and/or vehicle and necessary parts to a repair shop server and/or scheduling an appointment with the repair shop to repair the damaged home and/or vehicle; (5) identify the necessary parts to repair the damaged home and/or vehicle, and locating the nearest repair shop with the needed parts on hand and having immediate availability to repair the home and/or vehicle, and/or transmit repair options, such as available repair shops and body shops and available times for the repair work to be performed, to the home and/or vehicle owner's mobile device for their review and selection of a repair shop or body shop/time; (6) contact a vehicle salvage company if the vehicle is deemed a total loss, such as transmitting the damaged vehicle's location to the salvage company's server such that the vehicle salvage company may send a vehicle to retrieve the damaged vehicle; (7) contact a taxi service or ride-share service if the vehicle is too damaged or dangerous to drive but the operator and/or passengers are not too injured to the extent emergency services need to be called, such as transmitting the damaged vehicle's location to the taxi service or ride-share service's server such that the taxi service or ride-share service may send a taxi or ride-share to transport the operator and any passengers of the damaged vehicle to another location; (8) reconstruct a vehicle collision and determining a percentage fault for the vehicle collision for each driver and/or autonomous vehicle involved in the collision; and/or (9) initiate call to the insured, owner, resident, and/or operator to see what, if any, immediate assistance is needed at the scene of the vehicle collision and/or property damage.

In some embodiments, all of the data collected (e.g., the telematics data, electronic device data, smart infrastructure data, and other data mentioned elsewhere herein) may be fed into one or more trained machine learning models (or software programs, algorithms, etc.) that are trained with historical data (such as historical data associated with past sensor data (e.g., detections of lane swerving, coming too close to other cars in a lane change, sudden braking, leaving lights on overnight in a home, excessive water usage, etc.), past enablement and/or activation of safety features installed in the home and/or vehicle (e.g., past traffic violations, past vehicle collisions, past home damage, past vehicle damage, past damaged parts, past personal injuries, etc.). As an example, the trained machine learning models may each be trained to identify vehicle collisions, property damage, vehicle damage, type of homes, type of vehicles, extent of home damage, extent of vehicle damage, estimated cost of home damage, estimated cost of vehicle damage, estimated cost to repair the home, or estimated cost to repair the vehicle, total loss vehicles, and the other parametric events or actions mentioned elsewhere herein.

The trained machine learning model may be trained to identify home-related and/or vehicle-related events or factors. The home-related and/or vehicle-related events or factors may include identifying one or more of: (i) a sensor has been activated; (ii) a safety feature has been enabled and/or activated; (iii) the status of a sensor (e.g., effective, defective, in need of repair or replacement, etc.); (iv) the status of a safety feature (e.g., effective, defective, in need of repair or replacement, etc.); (v) the effectiveness of a sensor; (vi) the effectiveness of a safety feature; (vii) a vehicle collision has occurred; (viii) property damage has occurred; (ix) an amount of vehicle damage; (x) an amount of property damage; (xi) an estimated severity of the vehicle collision; (xii) an estimated severity of the property damage; (xiii) an estimated severity of personal injuries; (xiv) an estimated cost to repair the home, home parts, vehicle and/or vehicle parts; (xv) an estimated cost to replace the home parts, vehicle, and/or vehicle parts; (xvi) that a tow vehicle is needed to tow a damaged vehicle; (xvii) that a taxi or ride-share is needed to transport the operator and/or passengers of the damaged vehicle; (xviii) that an ambulance is needed at the scene of the vehicle collision and/or property damage; (xix) parts needed to repair the damaged home and/or vehicle; (xx) a nearby repair shop and/or body shop with the parts and expertise necessary to repair the home and/or vehicle; and/or (xxi) other home-related and/or vehicle-related events or factors discussed elsewhere herein.

In some embodiments, the following method and/or system may occur. Sensors of the home and/or vehicle may trigger (e.g., to detect the enablement and/or activation of a safety feature. The home and/or vehicle may transmit either the sensor data (e.g., the raw sensor data or processed sensor data) and/or data related to the sensor (e.g., a notification or indication that a sensor was triggered and/or a safety feature was enabled and/or activated, etc.) to a server (such as a server configured to operate as the node 120 of FIG. 1). The home and/or vehicle may transmit the sensor data either periodically (e.g., the first of every month), or after a certain event triggers the home and/or vehicle to transmit the sensor data (e.g., a parametric event, a request from a server for the sensor data, etc.). The server may process the sensor data (e.g., to create a record of how many times the safety feature was enabled and/or activated and the contexts by which it was enabled and/or activated). For example, the server may determine from the sensor data that the automatic cruise control of the vehicle was activated while on a highway at night. The server may record this determination to the blockchain record associated with the home and/or vehicle. The record may be deployed on a blockchain and may include one or more vehicle build sheets and/or building blueprints and/or schematics. Once the record has been updated by the server, the server may then calculate an insurance premium (e.g., by an insurance entity not currently insuring the home and/or vehicle) and/or adjust an insurance premium (by an insurance entity currently insuring the home and/or vehicle) based upon the processed sensor data.

In some embodiments, the following method and/or system may occur: home and/or vehicle sensors may trigger to detect a parametric event; the trigger may send data to the insurer entity's servers indicating that a parametric event occurred; the insurer entity may then attempt to contact the owner and/or resident of the home and/or the operator of the vehicle directly (e.g., via a phone call) and/or indirectly through an automated system (e.g., the insurer entity's servers send a push notification to an application on a smart device) requesting for confirmation of the parametric event as well as any other serves to be performed on the operator, owner, and/or resident's behalf (e.g., requesting dispatch of EMTs, police, tow trucks, taxi or ride-share services, vehicle salvage vendors or requesting to contact repair shops and/or body shops, etc.); receiving the operator, owner, and/or resident's responses; and/or contacting the selected services and entities in response to the operator, owner, and/or resident's responses. In some embodiments, a timing mechanism might be deployed in the event the operator, owner, and/or resident is unable to respond via the application (e.g., the operator is unconscious, the mobile phone received too much damage to function, etc.). When the timing mechanism is triggered, the insurer entity's servers will contact each entity from a set of default settings (for example, a default could be setting the system to call for the dispatch of EMTs, police, and a tow truck as well as a repair shop, but not setting the system to call for the dispatch of a taxi or rideshare or a vehicle salvage vendor or to call a body shop). In some embodiments, the insurer entity may monitor the status of each of the entities contact (e.g., ensuring the ride-share service reached the operator, checking on the status of a repair at a body shop, etc.).

Additional Exemplary Embodiments: The Vehicle Record

In one aspect, a computer-implemented method for generating one or more smart contracts for deployment onto a blockchain may be provided. The method may be implemented via one or more local or remote processors, transceivers, sensors, servers, memory units, wearables, smart glasses, augmented reality glasses, virtual reality headsets, mobile devices, smart watches, and/or other electronic or electrical components. The method may include: (1) receiving, by one or more processors, vehicle information related to a vehicle; (2) analyzing, by the one or more processors, the vehicle information to identify one or more safety features installed in the vehicle; (3) generating, by the one or more processors and based upon the one or more safety features identified, a smart contract that may be configured to (i) maintain a set of indications related to whether safety features in the one or more safety features installed in the vehicle have been activated, and (ii) automatically execute on the blockchain based upon the maintained set of indications; and/or (4) deploying, by the one or more processors, the smart contract at a particular address on the blockchain.

Additionally or alternatively to the foregoing method, the method may include: reading, by the one or more processors, a vehicle record associated with the vehicle that may include a first list of safety features associated with the vehicle; analyzing, by the one or more processors, the vehicle information to identify a second list of safety features associated with the vehicle; comparing, by the one or more processors, the first list of safety features to the second lists of safety features; identifying, by the one or more processors, that a particular safety feature included in the second list of safety features is not included in the first list of safety features; and/or writing, to the vehicle record, an indication that the particular safety feature is installed in the vehicle.

Additionally or alternatively to the foregoing method, the method may include: monitoring, by the one or more processors, the one or more safety features to determine that a particular safety feature of the one or more safety features was activated, wherein monitoring the one or more safety features may include receiving, by the one or more processors and from the vehicle, a notification that the one or more safety features activated; and/or recording, to the smart contract, an indication that the particular safety feature was activated.

Additionally or alternatively to the foregoing method, the method may include: reading, by the one or more processors, a vehicle record associated with the vehicle that may include a first list of safety features associated with the vehicle; analyzing, by the one or more processors, the vehicle information to identify a second list of safety features associated with the vehicle; comparing, by the one or more processors, the first list of safety features to the second lists of safety features, wherein comparing the first list of safety features to the second list of safety features may include identifying, by the one or more processors, that a particular safety feature included in the first list of safety features is not included in the second list of safety features, analyzing, via the one or more processors, the vehicle information to detect that the particular safety feature was not activated during a scenario in which activation of the particular safety feature is expected, and/or in response to detecting that the particular safety feature was not activated during a scenario in which activation of the particular safety feature is expected, recording, to the smart contract, the indication that the particular safety feature was not activated; identifying, by the one or more processors, that a particular safety feature included in the second list of safety features is not included in the first list of safety features; and/or writing, to the vehicle record, an indication that the particular safety feature is installed in the vehicle. The vehicle information may include vehicle sensor data, geolocation data, and/or time data. The scenario in which activation of the particular safety feature may be expected may include the vehicle being operated on a highway.

Additionally or alternatively to the foregoing method, configuring the smart contract may include configuring the smart contract to define an action that may be performed in response to the occurrence of a triggering event wherein the triggering event may include the occurrence of at least one of (i) a lapsing of a predetermined amount of time, and/or (ii) the inclusion of an indication in the set of indications. The action to be performed may include initiating an insurance premium adjustment for an insurance product associated with the vehicle, wherein the insurance premium adjustment may be based upon the set of indications maintained at the smart contract. Additionally or alternatively to the foregoing method, the method may include performing, via the one or more processors, the action at the direction of the smart contract.

Additionally or alternatively to the foregoing method, the one or more safety features may include any one of an adaptive cruise control or an emergency breaking system; the vehicle information may include vehicle sensor data generated from sensors mounted on or within the vehicle; the indications related to whether safety features in the one or more safety features installed in the vehicle have been activated may include data selected from the group of (i) an identity of a safety feature, (ii) time data, (iii) geolocation data, (iv) duration of time of activation data (v) an indication a safety feature was not activated, and/or (vi) a combination thereof.

In another aspect, a computer system for providing a graphic user interface to facilitate the generation of a plurality of smart contracts for deployment onto a blockchain, the computer system may be provided. The computer system may include one or more local or remote processors, transceivers, sensors, servers, memory units, wearables, smart glasses, augmented reality glasses, virtual reality headsets, mobile devices, smart watches, and/or other electronic or electrical components. For example, the computer system may include one or more processors; and a non-transitory program memory coupled to the one or more processors and storing executable instructions that, when executed by the one or more processors, cause the computer system to: (1) receive vehicle information related to a vehicle; (2) analyze the vehicle information to identify one or more safety features installed in the vehicle; (3) generate based upon the one or more safety features identified, a smart contract that may be configured to (i) maintain a set of indications related to whether safety features in the one or more safety features installed in the vehicle have been activated, and (ii) automatically execute on the blockchain based upon the maintained set of indications; and/or (4) deploy the smart contract at a particular address on the blockchain.

Additionally or alternatively to the foregoing system, the instructions may further cause the system to: read a vehicle record associated with the vehicle that may include a first list of safety features associated with the vehicle; analyze the vehicle information to identify a second list of safety features associated with the vehicle; compare the first list of safety features to the second lists of safety features; identify that a particular safety feature included in the second list of safety features is not included in the first list of safety features; and/or write, an indication that the particular safety feature is installed in the vehicle.

Additionally or alternatively to the foregoing system, the instructions may further cause the system to: monitor the one or more safety features to determine that a particular safety feature of the one or more safety features was activated, wherein monitoring the one or more safety features may include receiving, by the one or more processors and from the vehicle, a notification that the one or more safety features activated; and/or record, to the smart contract, an indication that the particular safety feature was activated.

Additionally or alternatively to the foregoing system, the instructions may further cause the system to: read a vehicle record associated with the vehicle that may include a first list of safety features associated with the vehicle; analyze the vehicle information to identify a second list of safety features associated with the vehicle; compare the first list of safety features to the second lists of safety features, wherein comparing the first list of safety features to the second list of safety features may include identifying, by the one or more processors, that a particular safety feature included in the first list of safety features is not included in the second list of safety features, analyzing, via the one or more processors, the vehicle information to detect that the particular safety feature was not activated during a scenario in which activation of the particular safety feature is expected, and/or in response to detecting that the particular safety feature was not activated during a scenario in which activation of the particular safety feature is expected, recording, to the smart contract, the indication that the particular safety feature was not activated; identify that a particular safety feature included in the second list of safety features is not included in the first list of safety features; and/or writing, to the vehicle record, an indication that the particular safety feature is installed in the vehicle. The vehicle information may include vehicle sensor data, geolocation data, and/or time data. The scenario in which activation of the particular safety feature may be expected may include the vehicle being operated on a highway.

Additionally or alternatively to the foregoing system, configuring the smart contract may include configuring the smart contract to define an action that may be performed in response to the occurrence of a triggering event wherein the triggering event may include the occurrence of at least one of (i) a lapsing of a predetermined amount of time, and/or (ii) the inclusion of an indication in the set of indications. The action to be performed may include initiating an insurance premium adjustment for an insurance product associated with the vehicle, wherein the insurance premium adjustment may be based upon the set of indications maintained at the smart contract. Additionally or alternatively to the foregoing system, the method may include performing, via the one or more processors, the action at the direction of the smart contract.

Additionally or alternatively to the foregoing system, the one or more safety features may include any one of an adaptive cruise control or an emergency breaking system; the vehicle information may include vehicle sensor data generated from sensors mounted on or within the vehicle; the indications related to whether safety features in the one or more safety features installed in the vehicle have been activated may include data selected from the group of (i) an identity of a safety feature, (ii) time data, (iii) geolocation data, (iv) duration of time of activation data (v) an indication a safety feature was not activated, and/or (vi) a combination thereof.

In another aspect, a tangible, a non-transitory computer-readable medium may store executable instructions for providing a graphic user interface to facilitate the generation of a plurality of smart contracts for deployment onto a blockchain. The executable instructions, when executed, may cause one or more processors to: (1) receive vehicle information related to a vehicle; (2) analyze the vehicle information to identify one or more safety features installed in the vehicle; (3) generate based upon the one or more safety features identified, a smart contract that may be configured to (i) maintain a set of indications related to whether safety features in the one or more safety features installed in the vehicle have been activated, and (ii) automatically execute on the blockchain based upon the maintained set of indications; and/or (4) deploy the smart contract at a particular address on the blockchain.

Additionally or alternatively to the foregoing executable instructions, the executable instructions may further cause the one or more processors to: read a vehicle record associated with the vehicle that may include a first list of safety features associated with the vehicle; analyze the vehicle information to identify a second list of safety features associated with the vehicle; compare the first list of safety features to the second lists of safety features; identify that a particular safety feature included in the second list of safety features is not included in the first list of safety features; and/or write, an indication that the particular safety feature is installed in the vehicle.

Additionally or alternatively to the foregoing executable instructions, the executable instructions may further cause the one or more processors to: monitor the one or more safety features to determine that a particular safety feature of the one or more safety features was activated, wherein monitoring the one or more safety features may include receiving, by the one or more processors and from the vehicle, a notification that the one or more safety features activated; and/or record, to the smart contract, an indication that the particular safety feature was activated.

Additionally or alternatively to the foregoing executable instructions, the executable instructions may further cause the one or more processors to: read a vehicle record associated with the vehicle that may include a first list of safety features associated with the vehicle; analyze the vehicle information to identify a second list of safety features associated with the vehicle; compare the first list of safety features to the second lists of safety features, wherein comparing the first list of safety features to the second list of safety features may include identifying, by the one or more processors, that a particular safety feature included in the first list of safety features is not included in the second list of safety features, analyzing, via the one or more processors, the vehicle information to detect that the particular safety feature was not activated during a scenario in which activation of the particular safety feature is expected, and/or in response to detecting that the particular safety feature was not activated during a scenario in which activation of the particular safety feature is expected, recording, to the smart contract, the indication that the particular safety feature was not activated; identify that a particular safety feature included in the second list of safety features is not included in the first list of safety features; and/or writing, to the vehicle record, an indication that the particular safety feature is installed in the vehicle. The vehicle information may include vehicle sensor data, geolocation data, and/or time data. The scenario in which activation of the particular safety feature may be expected may include the vehicle being operated on a highway.

Additionally or alternatively to the foregoing executable instructions, configuring the smart contract may include configuring the smart contract to define an action that may be performed in response to the occurrence of a triggering event wherein the triggering event may include the occurrence of at least one of (i) a lapsing of a predetermined amount of time, and/or (ii) the inclusion of an indication in the set of indications. The action to be performed may include initiating an insurance premium adjustment for an insurance product associated with the vehicle, wherein the insurance premium adjustment may be based upon the set of indications maintained at the smart contract. Additionally or alternatively to the foregoing system, the method may include performing, via the one or more processors, the action at the direction of the smart contract.

Additionally or alternatively to the foregoing executable instructions, the one or more safety features may include any one of an adaptive cruise control or an emergency breaking system; the vehicle information may include vehicle sensor data generated from sensors mounted on or within the vehicle; the indications related to whether safety features in the one or more safety features installed in the vehicle have been activated may include data selected from the group of (i) an identity of a safety feature, (ii) time data, (iii) geolocation data, (iv) duration of time of activation data (v) an indication a safety feature was not activated, and/or (vi) a combination thereof.

Additional Exemplary Embodiments: Telematics Data

In one aspect, a computer-implemented method for calculating an insurance premium using a blockchain. The method may be implemented via one or more local or remote processors, transceivers, sensors, servers, memory units, wearables, smart glasses, augmented reality glasses, virtual reality headsets, mobile devices, smart watches, and/or other electronic or electrical components. In one aspect, the method may include: (1) receiving, by one or more processors, telematics data associated with an insured asset; (2) analyzing, by the one or more processors, the telematics data to detect a characteristic associated with the insured asset; (3) identifying, by the one or more processors, a record on the blockchain related to the insured asset, wherein the record includes an indication of smart contract deployed on the blockchain and associated with the characteristic of the insured asset; (4) recording, to the smart contract, an indication of the detected characteristic associated with the insured asset; and/or (5) adjusting, as directed of the smart contract, an insurance premium associated with the insured asset, wherein the smart contract may be configured to calculate the insurance premium based upon the detected characteristic associated with the insured asset.

Additionally and/or alternatively to the foregoing method, the insured asset may be a vehicle; the telematics data may include vehicle telematics data associated with the vehicle; the characteristic associated with the insured asset may be a metric indicative of operation of the vehicle; analyzing the telematics data may include analyzing, by the one or more processors, the vehicle telematics data to determine the metric indicative of operation of the vehicle, wherein the metric indicative of operation of the vehicle may be based upon at least one of an acceleration metric, a braking metric, a cornering metric, a responsibility metric, and/or a vehicle safety feature effectiveness metric; and/or receiving the vehicle telematics data may include receiving, by the one or more processors, the vehicle telematics data from at least one of a mobile device associated with the vehicle or a vehicle control system of the vehicle.

Additionally and/or alternatively to the foregoing method, the insured asset may be a home; the telematics data may include home telematics data associated with the home; the characteristic associated with the insured asset may be a metric indicative of operation of the home; analyzing the telematics data may include analyzing, by the one or more processors, the home telematics data to determine the metric indicative of operation of the home, wherein the metric indicative of operation of the home may be based upon at least one of an electricity usage metric, a water usage metric, a security metric, and/or a loss prevention metric; and/or receiving the home telematics data may include receiving, by the one or more processors, the home telematics data from at least one of a mobile device associated with the home or a home control system of the home.

Additionally and/or alternatively to the foregoing method, the smart contract deployed to the blockchain may be configured to self-execute to perform an action in response to detecting a triggering event; the triggering event may be at least one of (i) a lapsing of a predetermined amount of time, and/or (ii) the indication of the detected characteristic being recorded to the smart contract; and/or the action to be performed may include initiating an insurance premium adjustment for an insurance product associated with the insured asset, wherein the insurance premium adjustment may be based upon a set of indications recorded to the smart contract. Additionally and/or alternatively to the foregoing method, the method may further include performing, via the one or more processors, the action as directed by the smart contract.

Additionally and/or alternatively to the foregoing method, the method may further include: storing, by the one or more processors, the telematics data at a database; and/or updating, by the one or more processors, the record on the blockchain to include at least one of (i) an indication of a location at the database at which the telematics data may be accessed and/or (ii) a hash of the stored telematics data. Additionally and/or alternatively to the foregoing method, the telematics data may include at least one of throttle data, braking data, steering data, cornering data, acceleration data, speed data, direction data, heading data, safety feature data, home occupancy data, water usage data, electricity usage data, location data, date data, and/or time data.

In another aspect, a computer system for providing a graphic user interface to facilitate the generation of a plurality of smart contracts for deployment onto a blockchain, the computer system may be provided. The computer system may include one or more local or remote processors, transceivers, sensors, servers, memory units, wearables, smart glasses, augmented reality glasses, virtual reality headsets, mobile devices, smart watches, and/or other electronic or electrical components. For example, the computer system may include one or more processors; and a non-transitory program memory coupled to the one or more processors and storing executable instructions that, when executed by the one or more processors, cause the computer system to: (1) receive telematics data associated with an insured asset; (2) analyze the telematics data to detect a characteristic associated with the insured asset; (3) identify a record on the blockchain related to the insured asset, wherein the record includes an indication of smart contract deployed on the blockchain and associated with the characteristic of the insured asset; (4) record, to the smart contract, an indication of the detected characteristic associated with the insured asset; and/or (5) adjust, as directed of the smart contract, an insurance premium associated with the insured asset, wherein the smart contract may be configured to calculate the insurance premium based upon the detected characteristic associated with the insured asset.

Additionally and/or alternatively to the foregoing system, the insured asset may be a vehicle; the telematics data may include vehicle telematics data associated with the vehicle; the characteristic associated with the insured asset may be a metric indicative of operation of the vehicle; analyzing the telematics data may include analyzing the vehicle telematics data to determine the metric indicative of operation of the vehicle, wherein the metric indicative of operation of the vehicle may be based upon at least one of an acceleration metric, a braking metric, a cornering metric, a responsibility metric, and/or a vehicle safety feature effectiveness metric; and/or receiving the vehicle telematics data may include receiving the vehicle telematics data from at least one of a mobile device associated with the vehicle or a vehicle control system of the vehicle.

Additionally and/or alternatively to the foregoing system, the insured asset may be a home; the telematics data may include home telematics data associated with the home; the characteristic associated with the insured asset may be a metric indicative of operation of the home; analyzing the telematics data may include analyzing the home telematics data to determine the metric indicative of operation of the home, wherein the metric indicative of operation of the home may be based upon at least one of an electricity usage metric, a water usage metric, a security metric, and/or a loss prevention metric; and/or receiving the home telematics data may include receiving the home telematics data from at least one of a mobile device associated with the home or a home control system of the home.

Additionally and/or alternatively to the foregoing system, the smart contract deployed to the blockchain may be configured to self-execute to perform an action in response to detecting a triggering event; the triggering event may be at least one of (i) a lapsing of a predetermined amount of time, and/or (ii) the indication of the detected characteristic being recorded to the smart contract; and/or the action to be performed may include initiating an insurance premium adjustment for an insurance product associated with the insured asset, wherein the insurance premium adjustment may be based upon a set of indications recorded to the smart contract. Additionally and/or alternatively to the foregoing system, the instructions may further cause the system to: perform the action as directed by the smart contract.

Additionally and/or alternatively to the foregoing system, the instructions may further cause the system to: store the telematics data at a database; and/or update the record on the blockchain to include at least one of (i) an indication of a location at the database at which the telematics data may be accessed and/or (ii) a hash of the stored telematics data. Additionally and/or alternatively to the foregoing system, the telematics data may include at least one of throttle data, braking data, steering data, cornering data, acceleration data, speed data, direction data, heading data, safety feature data, home occupancy data, water usage data, electricity usage data, location data, date data, and/or time data.

In another aspect, a tangible, a non-transitory computer-readable medium may store executable instructions for providing a graphic user interface to facilitate the generation of a plurality of smart contracts for deployment onto a blockchain. The executable instructions, when executed, may cause one or more processors to: (1) receive telematics data associated with an insured asset; (2) analyze the telematics data to detect a characteristic associated with the insured asset; (3) identify a record on the blockchain related to the insured asset, wherein the record includes an indication of smart contract deployed on the blockchain and associated with the characteristic of the insured asset; (4) record, to the smart contract, an indication of the detected characteristic associated with the insured asset; and/or (5) adjust, as directed of the smart contract, an insurance premium associated with the insured asset, wherein the smart contract may be configured to calculate the insurance premium based upon the detected characteristic associated with the insured asset.

Additionally and/or alternatively to the foregoing executable instructions, the insured asset may be a vehicle; the telematics data may include vehicle telematics data associated with the vehicle; the characteristic associated with the insured asset may be a metric indicative of operation of the vehicle; analyzing the telematics data may include analyzing the vehicle telematics data to determine the metric indicative of operation of the vehicle, wherein the metric indicative of operation of the vehicle may be based upon at least one of an acceleration metric, a braking metric, a cornering metric, a responsibility metric, and/or a vehicle safety feature effectiveness metric; and/or receiving the vehicle telematics data may include receiving the vehicle telematics data from at least one of a mobile device associated with the vehicle or a vehicle control system of the vehicle.

Additionally and/or alternatively to the foregoing executable instructions, the insured asset may be a home; the telematics data may include home telematics data associated with the home; the characteristic associated with the insured asset may be a metric indicative of operation of the home; analyzing the telematics data may include analyzing the home telematics data to determine the metric indicative of operation of the home, wherein the metric indicative of operation of the home may be based upon at least one of an electricity usage metric, a water usage metric, a security metric, and/or a loss prevention metric; and/or receiving the home telematics data may include receiving the home telematics data from at least one of a mobile device associated with the home or a home control system of the home.

Additionally and/or alternatively to the foregoing executable instructions, the smart contract deployed to the blockchain may be configured to self-execute to perform an action in response to detecting a triggering event; the triggering event may be at least one of (i) a lapsing of a predetermined amount of time, and/or (ii) the indication of the detected characteristic being recorded to the smart contract; and/or the action to be performed may include initiating an insurance premium adjustment for an insurance product associated with the insured asset, wherein the insurance premium adjustment may be based upon a set of indications recorded to the smart contract. Additionally and/or alternatively to the foregoing executable instructions, the executable instructions may further cause the one or more processors to: perform the action as directed by the smart contract.

Additionally and/or alternatively to the foregoing executable instructions, the executable instructions may further cause the one or more processors to: store the telematics data at a database; and/or update the record on the blockchain to include at least one of (i) an indication of a location at the database at which the telematics data may be accessed and/or (ii) a hash of the stored telematics data. Additionally and/or alternatively to the foregoing executable instructions, the telematics data may include at least one of throttle data, braking data, steering data, cornering data, acceleration data, speed data, direction data, heading data, safety feature data, home occupancy data, water usage data, electricity usage data, location data, date data, and/or time data.

Additional Exemplary Embodiments: Portable Data

In one aspect, a computer-implemented method for generating one or more smart contracts for deployment onto a blockchain may be provided. The method may be implemented via one or more local or remote processors, transceivers, sensors, servers, memory units, wearables, smart glasses, augmented reality glasses, virtual reality headsets, mobile devices, smart watches, and/or other electronic or electrical components. In one aspect, the method may include: (1) receiving, by one or more processors and from a requestor, a request to calculate an insurance premium for a vehicle, wherein receiving the request may include receiving, by the one or more processors and from the requestor, authorization to access to vehicle information and receiving a security credential to access the vehicle information; (2) identifying, by the one or more processors, a vehicle record on the blockchain related to the vehicle, wherein the vehicle record identifies vehicle information related to the vehicle; (3) analyzing, by the one or more processors, the vehicle information to derive the insurance premium; and/or (4) transmitting, by the one or more processors, an indication of the insurance premium to the requestor.

Additionally or alternatively to the foregoing method, the vehicle information may include vehicle sensor data generated from sensors mounted on or within the vehicle; the vehicle record may indicate a location at which the vehicle sensor data may be stored; the vehicle information may include event information recorded to the vehicle record; the request may be a transaction written to the blockchain; the blockchain may include a smart contract configured to provide the security credential to the one or more processors in response to detecting the request; the security credential may be an encryption key to decrypt the vehicle information.

Additionally or alternatively to the foregoing method, receiving the security credential may include receiving, from a node of the blockchain enforcing the smart contract, the security credential. Configuring the smart contract to provide the security credential may include configuring the smart contract to update a security node to indicate that the one or more processors are authorized to access the vehicle information. The method may include transmitting, via the one or more processors and to the security node, a request to access the vehicle information.

Additionally or alternatively to the foregoing method, the method may include: generating, by the one or more processors, a smart contract that may be configured to (i) detect a transaction indicating the request to calculate the insurance premium for the vehicle, and (ii) automatically execute on the blockchain in response to detecting the request; deploying, by the one or more processors, the smart contract at a particular address on the blockchain; and/or wherein the smart contract may be configured to automatically execute an action in response to detecting the request, wherein the action may include: accessing the vehicle information, performing the analysis of the vehicle information to derive the insurance premium, and/or transmitting an indication of the insurance premium to the requestor. The method may include additional, less, or alternate functionality, including that discussed elsewhere herein.

In another aspect, a computer system for providing a graphic user interface to facilitate the generation of a plurality of smart contracts for deployment onto a blockchain, the computer system may be provided. The computer system may include one or more local or remote processors, transceivers, sensors, servers, memory units, wearables, smart glasses, augmented reality glasses, virtual reality headsets, mobile devices, smart watches, and/or other electronic or electrical components. For example, the computer system may include one or more processors; and a non-transitory program memory coupled to the one or more processors and storing executable instructions that, when executed by the one or more processors, cause the computer system to: (1) receive a request to calculate an insurance premium for a vehicle; (2) identify a vehicle record on the blockchain related to the vehicle, wherein the vehicle record identifies vehicle information related to the vehicle; (3) analyze the vehicle information to derive the insurance premium; and/or (4) transmit an indication of the insurance premium to the requestor.

Additionally or alternatively to the foregoing system, the vehicle information may include vehicle sensor data generated from sensors mounted on or within the vehicle; the vehicle record may indicate a location at which the vehicle sensor data may be stored; the vehicle information may include event information recorded to the vehicle record; the request may be a transaction written to the blockchain; the blockchain may include a smart contract configured to provide the security credential to the one or more processors in response to detecting the request; the security credential may be an encryption key to decrypt the vehicle information.

Additionally or alternatively to the foregoing system, receiving the security credential may include receiving, from a node of the blockchain enforcing the smart contract, the security credential. Configuring the smart contract to provide the security credential may include configuring the smart contract to update a security node to indicate that the one or more processors are authorized to access the vehicle information. The method may include: transmitting, via the one or more processors and to the security node, a request to access the vehicle information.

Additionally or alternatively to the foregoing system, the instructions may further cause the system to: generate a smart contract that may be configured to (i) detect a transaction indicating the request to calculate the insurance premium for the vehicle, and (ii) automatically execute on the blockchain in response to detecting the request; deploy the smart contract at a particular address on the blockchain; and/or wherein the smart contract may be configured to automatically execute an action in response to detecting the request, wherein the action may include: accessing the vehicle information, performing the analysis of the vehicle information to derive the insurance premium, and/or transmitting an indication of the insurance premium to the requestor. The computer system may include additional, less, or alternate functionality, including that discussed elsewhere herein.

In another aspect, a tangible, a non-transitory computer-readable medium may store executable instructions for providing a graphic user interface to facilitate the generation of a plurality of smart contracts for deployment onto a blockchain. The executable instructions, when executed, may cause one or more processors to: (1) receive a request to calculate an insurance premium for a vehicle; (2) identify a vehicle record on the blockchain related to the vehicle, wherein the vehicle record identifies vehicle information related to the vehicle; (3) analyze the vehicle information to derive the insurance premium; and/or (4) transmit an indication of the insurance premium to the requestor.

Additionally or alternatively to the foregoing executable instructions, the vehicle information may include vehicle sensor data generated from sensors mounted on or within the vehicle; the vehicle record may indicate a location at which the vehicle sensor data may be stored; the vehicle information may include event information recorded to the vehicle record; the request may be a transaction written to the blockchain; the blockchain may include a smart contract configured to provide the security credential to the one or more processors in response to detecting the request; the security credential may be an encryption key to decrypt the vehicle information.

Additionally or alternatively to the foregoing executable instructions, receiving the security credential may include receiving, from a node of the blockchain enforcing the smart contract, the security credential. Configuring the smart contract to provide the security credential may include configuring the smart contract to update a security node to indicate that the one or more processors are authorized to access the vehicle information. The method may include transmitting, via the one or more processors and to the security node, a request to access the vehicle information.

Additionally or alternatively to the foregoing executable instructions, the executable instructions may further cause the one or more processors to: generating, by the one or more processors, a smart contract that may be configured to (i) detect a transaction indicating the request to calculate the insurance premium for the vehicle, and (ii) automatically execute on the blockchain in response to detecting the request; deploying, by the one or more processors, the smart contract at a particular address on the blockchain; and/or wherein the smart contract may be configured to automatically execute an action in response to detecting the request, wherein the action may include: accessing the vehicle information, performing the analysis of the vehicle information to derive the insurance premium, and/or transmitting an indication of the insurance premium to the requestor. The instructions may direct additional, less, or alternate functionality, including that discussed elsewhere herein.

In one aspect, a computer-implemented method for generating one or more smart contracts for deployment onto a blockchain may be provided. The method may be implemented via one or more local or remote processors, transceivers, sensors, servers, memory units, wearables, smart glasses, augmented reality glasses, virtual reality headsets, mobile devices, smart watches, and/or other electronic or electrical components. In one aspect, the method may include: (1) receiving, by one or more processors and from a requestor, a request to calculate an insurance premium for an asset associated with a record on the blockchain, wherein the record includes an indication of a location at which historical telematics data associated with the insured asset may be located; (2) obtaining, by the one or more processors, the historical telematics data from the indicated location; (3) analyzing, by the one or more processors, the historical telematics data to derive the insurance premium; and/or (4) transmitting, by the one or more processors, an indication of the derived insurance premium to the requestor.

Additionally or alternatively to the foregoing method, the asset may be a vehicle and/or a home; the historical telematics data may include vehicle telematics data and/or home telematics data generated by at least one of a mobile device associated with the vehicle, the home, a home control system of the home, and/or a vehicle control system of the vehicle.

Additionally or alternatively to the foregoing method, the method may further include: receiving, by the one or more processors and from the requestor, authorization to access the historical telematics data; transmitting, via the one or more processors and to the smart contract, a request to access the historical telematics data; and/or applying, by the one or more processors, a digital signature to the transmitted request, wherein the digital signature may be encrypted using a private key of a public/private key pair associated with the one or more processors.

Additionally or alternatively to the foregoing method, the request may be a transaction written to the blockchain; the blockchain may include a smart contract configured to provide the authorization to the one or more processors in response to detecting the request; to provide the authorization, the smart contract may be configured to update an access policy associated with the historical telematics data to indicate that the one or more processors are authorized to access the historical telematics data; and/or to provide the authorization, the smart contract may be configured to provide an encryption key that enables the one or more processors to decrypt the historical telematics data.

Additionally or alternatively to the foregoing method, the method may further include: generating, by the one or more processors, a smart contract that may be configured to (i) detect a transaction indicating the request to calculate the insurance premium for the asset, and (ii) automatically execute on the blockchain in response to detecting the request; and/or deploying, by the one or more processors, the smart contract at a particular address on the blockchain.

Additionally or alternatively to the foregoing method, the smart contract may be configured to automatically execute a set of actions in response to detecting the request, wherein the set of actions includes: requesting access to the historical telematics data, analyzing the historical telematics data to derive the insurance premium, and transmitting an indication of the insurance premium to the requestor.

In another aspect, a computer system for providing a graphic user interface to facilitate the generation of a plurality of smart contracts for deployment onto a blockchain, the computer system may be provided. The computer system may include one or more local or remote processors, transceivers, sensors, servers, memory units, wearables, smart glasses, augmented reality glasses, virtual reality headsets, mobile devices, smart watches, and/or other electronic or electrical components. For example, the computer system may include one or more processors; and/or a non-transitory program memory coupled to the one or more processors and storing executable instructions that, when executed by the one or more processors, cause the computer system to: (1) receive, from a requestor, a request to calculate an insurance premium for an asset associated with a record on the blockchain, wherein the record includes an indication of a location at which historical telematics data associated with the insured asset may be located; (2) obtain the historical telematics data from the indicated location; (3) analyze the historical telematics data to derive the insurance premium; and/or (4) transmit an indication of the derived insurance premium to the requestor.

Additionally or alternatively to the foregoing system, the asset may be a vehicle and/or a home; the historical telematics data may include vehicle telematics data and/or home telematics data generated by at least one of a mobile device associated with the vehicle, the home, a home control system of the home, and/or a vehicle control system of the vehicle.

Additionally or alternatively to the foregoing system, the instructions may further cause the system to: receive, from the requestor, authorization to access the historical telematics data; transmit, to the smart contract, a request to access the historical telematics data; and/or apply a digital signature to the transmitted request, wherein the digital signature may be encrypted using a private key of a public/private key pair associated with the one or more processors.

Additionally or alternatively to the foregoing system, the request may be a transaction written to the blockchain; the blockchain may include a smart contract configured to provide the authorization to the one or more processors in response to detecting the request; to provide the authorization, the smart contract may be configured to update an access policy associated with the historical telematics data to indicate that the one or more processors are authorized to access the historical telematics data; and/or to provide the authorization, the smart contract may be configured to provide an encryption key that enables the one or more processors to decrypt the historical telematics data.

Additionally or alternatively to the foregoing system, the instructions may further cause the system to: generate a smart contract that may be configured to (i) detect a transaction indicating the request to calculate the insurance premium for the asset, and (ii) automatically execute on the blockchain in response to detecting the request; and/or deploy the smart contract at a particular address on the blockchain.

Additionally or alternatively to the foregoing system, the smart contract may be configured to automatically execute a set of actions in response to detecting the request, wherein the set of actions includes: requesting access to the historical telematics data, analyzing the historical telematics data to derive the insurance premium, and transmitting an indication of the insurance premium to the requestor.

In another aspect, a tangible, a non-transitory computer-readable medium may store executable instructions for providing a graphic user interface to facilitate the generation of a plurality of smart contracts for deployment onto a blockchain. The executable instructions, when executed, may cause one or more processors to: (1) receive, from a requestor, a request to calculate an insurance premium for an asset associated with a record on the blockchain, wherein the record includes an indication of a location at which historical telematics data associated with the insured asset may be located; (2) obtain the historical telematics data from the indicated location; (3) analyze the historical telematics data to derive the insurance premium; and/or (4) transmit an indication of the derived insurance premium to the requestor.

Additionally or alternatively to the foregoing executable instructions, the asset may be a vehicle and/or a home; the historical telematics data may include vehicle telematics data and/or home telematics data generated by at least one of a mobile device associated with the vehicle, the home, a home control system of the home, and/or a vehicle control system of the vehicle.

Additionally or alternatively to the foregoing executable instructions, the executable instructions may further cause the one or more processors to: receive, from the requestor, authorization to access the historical telematics data; transmit, to the smart contract, a request to access the historical telematics data; and/or apply a digital signature to the transmitted request, wherein the digital signature may be encrypted using a private key of a public/private key pair associated with the one or more processors.

Additionally or alternatively to the foregoing executable instructions, the request may be a transaction written to the blockchain; the blockchain may include a smart contract configured to provide the authorization to the one or more processors in response to detecting the request; to provide the authorization, the smart contract may be configured to update an access policy associated with the historical telematics data to indicate that the one or more processors are authorized to access the historical telematics data; and/or to provide the authorization, the smart contract may be configured to provide an encryption key that enables the one or more processors to decrypt the historical telematics data.

Additionally or alternatively to the foregoing executable instructions, the executable instructions may further cause the one or more processors to: generate a smart contract that may be configured to (i) detect a transaction indicating the request to calculate the insurance premium for the asset, and (ii) automatically execute on the blockchain in response to detecting the request; and/or deploy the smart contract at a particular address on the blockchain.

Additionally or alternatively to the foregoing executable instructions, the smart contract may be configured to automatically execute a set of actions in response to detecting the request, wherein the set of actions includes: requesting access to the historical telematics data, analyzing the historical telematics data to derive the insurance premium, and transmitting an indication of the insurance premium to the requestor.

Exemplary Machine Learning

The present embodiments may involve the use of cognitive computing and/or machine learning techniques or algorithms, and/or other modeling techniques. As an example, vehicle sensor data, electronic device data, smart infrastructure, and other types of data generated or collected may be input into machine learning programs that are trained to (i) recognize a safety feature installed in a vehicle, (ii) identify the safety feature based upon its function, (iii) determine if the safety feature is entered onto a vehicle record related to the vehicle, (iv) populating the vehicle record with an identification of the safety feature, and/or (v) calculate an insurance premium. As another example, the vehicle sensor data, electronic device data, smart infrastructure, and other types of data generated or collected may be input into machine learning programs that are trained to (i) identify a vehicle collision or crash; (ii) severity of vehicle damage; (iii) damaged vehicle sensors, parts, and/or components; (iv) severity of potential injuries; and/or (v) other vehicle-related events or factors discussed elsewhere herein.

In certain embodiments, the cognitive computing and/or predictive modeling techniques discussed herein may heuristic engine and algorithms, and/or machine learning, cognitive learning, deep learning, combined learning, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as vehicle data or images, and/or de-personalized customer data, image, mobile device, insurer database, and/or third-party database data. The machine learning programs may utilize deep learning algorithms that may be primarily focused on pattern recognition and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to calculate and/or adjust an insurance premium, identify vehicle damage, and customize vehicle retrieval and/or repair for individual customers.

Exemplary Use Cases

There are several use cases for the present embodiments detailed herein. For instance, the use cases may include, or be associated with, the generation of auto, homeowners, or personal articles insurance quotes; handling insurance claims; estimating damage to insured assets; repair or replacement of damaged assets; generating home or auto loan quotes or loan processing; initial notice of loss and/or first notice of loss; vehicle build information; identifying driver behavior; collecting or generating vehicle and/or home telematics data; etc. A few use cases are mentioned below in more detail.

Use Case 1: Advance existing Vehicle Build Sheet Scores based upon ADAS (VBI) by adding additional OEMs. The use case may involve vehicle OEMs providing vehicle build sheets and governmental entities (such as the Insurance Institute for Highway Safety (IIHS) and the National Highway Traffic Safety Administration (NHTZA)) providing information. Generally, the more OEMs that provide build sheets the better modeling that may be performed. By obtaining vehicle build sheets from additional OEMs, an insurer may be able to provide more accurate discounts to insureds.

Use Case 2: Instantaneous Notice of Loss (INOL). This use case would accelerate the existing First Notice of Loss process by using vehicle sensors to alert of incident—making notification instantaneous. Insurers may partner with vehicle manufacturers and include other parties in the loss/repair process such as: first responders, tow companies, rental car companies, repair facilities, etc. Participation by consumers/policyholders may be an opt-in process, and upon alert of incident, may require them to verify assistance required and the level of service required (e.g., tow truck). The goal of the INOL product may be to lessen the burden of manual loss reporting and redirect the process to a data driven solution.

The INOL use case may provide an opportunity to identify losses more quickly, thereby enabling quicker resolution. Additionally, the INOL use case may provide a better customer experience following a loss (e.g., quicker resolution, proactive recovery services), improve claim data reliability by minimizing or removing the self-reporting process, and/or enable accident reconstruction models via the use of instantaneous data feeds.

Use Case 3: Extending existing Vehicle Build Sheet Scores based upon ADAS (VBI) by understanding not only if customers/insureds/users have adaptive cruise control, but also that they are on highways and they use it and other things like emergency braking. This use case may ensure that an insurance discount for vehicle safety features may be provided in relation to policyholder usage of the features.

Use Case 4: Using in-vehicle sensors to understand our customers driving behaviors along with their actual usage of their vehicle (including location and times, such as, late nights) to determine and provide a more personalized accurate rate. This use case may enable insurers to provide a more accurately priced rating for customers based upon their actual driving habits.

In some examples, vehicle telematics data may be provided by Cambridge Mobile Telematics (CMT). CMT may provide an AI-driven platform, DriveWell®, that gathers sensor data from millions of IoT devices—including smartphones, proprietary tags, connected vehicles, dashcams, and third-party devices—and fuses them with contextual data to create a unified view of vehicle and driver behavior. As another example, telematics data may be provided by Motion-S to generate accurate driver safety analytics. As another example, vehicle telematics data (including acceleration, braking, cornering, speed, direction, heading, location, date, and/or time data) may be generated or otherwise collected by an application running on a mobile device, on-board vehicle computer, or smart vehicle control system.

Use Case 5: Bring-Your-Own-Telematics Data. In this use case a policyholder may take their driving data with them to a new carrier to proactively receive a discount. That is, when the policyholder is quoting new carriers, their historical, personalized driving behavior data may be utilized to provide a discount.

Based upon market research, each insurer generally uses slightly different driving metrics to calculate their discounts. Additionally, each source of telematics data may provide slightly different information. Accordingly, to facilitate a "Bring-your-own-telematics" data program, the collection of telematics data may be either standardized or detailed.

In addition to vehicle telematics data, certain embodiments may involve the generation, collection, and/or usage of home telematics data, such as data related to home occupancy, water usage within the home, and/or electricity usage within the home. For instance, home telematics data may be generated or collected by home-mounted sensors, mobile devices or mobile device sensors, or vehicle-mounted sensors, such as sensors in wireless or wired communication with a smart home controller.

Additional Considerations

As noted herein, after collection of the information regarding a home and/or vehicle by one or more nodes within a communication network, a transaction (and/or new block) including the home and/or vehicle information collected may be broadcast to the blockchain, and/or a new block verified and then added to the blockchain to reflect an updated state of the home and/or vehicle. For the computer-implemented methods discussed herein, in some embodiments, a transaction and/or new block may be generated and then broadcast to the blockchain network for verification once telematics data, and/or other data, have been generated and/or collected by one or more nodes within the communication network. As such, tracking the status of a home and/or vehicle may be more reliable and/or fraud-resistant as each node may include a proof-of-identity in its transaction modifying the state of the home and/or vehicle and/or the home-related and/or vehicle-related blocks or blockchain.

Further, with the computer-implemented methods discussed herein, network participants may function as full nodes that validate and/or generate new blocks and transactions, and/or compile transactions into blocks that may be then added to the network. However, not all participants need be nodes that compile transactions into blocks, and/or validate transactions and blocks received from other network participants—as some network participants may wish to rely on other network nodes to provide computer processing and/or storage services that enable usage of the system or blockchain.

In some scenarios, the blockchain may have public interfaces that allow visibility into the data. In certain embodiments, a private blockchain interface may also be used by auto manufacturers, law enforcement, insurers, and regulatory agencies.

An element of smart contracts may also be enabled in the system. Depending on the sequence of events in the blockchain, terms of the smart contract may be executed immediately.

In some embodiments, operators, owners, and/or residents may opt-in to a rewards, loyalty, discount, or other program. The operator, owners, and/or residents may allow a remote server, such as node 120, to collect telematics data, mobile device data, and other types of data discussed herein. With owner, resident, and/or operator permission or affirmative consent, the data collected may be analyzed to provide certain benefits to owners, residents, and/or operators, as discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, some embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules may provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "receiving," "analyzing," "generating," "creating," "storing," "deploying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "some embodiments" means that a particular element, feature, structure, or characteristic described in connection with the embodiment may be included in at least one embodiment. The appearances of the phrase "some embodiments" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein.

Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for data portability using a blockchain, the method comprising:
   receiving, by one or more processors and from a requestor, a request to calculate an insurance premium for a vehicle;
   receiving, by the one or more processors and from the requestor, a digital signature created using a private key corresponding to a public key that is registered in a public key repository, wherein the public key repository is stored on the blockchain and accessible by an asset smart contract associated with the vehicle on the blockchain;
   verifying, via the asset smart contract, the digital signature using the public key repository;
   identifying, by the one or more processors, a vehicle record on the blockchain related to the vehicle, wherein the vehicle record identifies vehicle information related to the vehicle, wherein access by the requestor to the vehicle information is governed by an access policy configured by a vehicle owner and enforced by the asset smart contract, wherein the access policy specifies one or more of scope, duration, or type of vehicle data accessible to the requestor, and wherein the asset smart contract determines an authorized subset of vehicle information made available to the one or more processors in accordance with the access policy;
   analyzing, by the one or more processors, the authorized subset of vehicle information to derive the insurance premium; and
   transmitting, by the one or more processors, an indication of the insurance premium to the requestor.

2. The computer-implemented method of claim 1, wherein the vehicle information includes vehicle sensor data generated from sensors mounted on or within the vehicle.

3. The computer-implemented method of claim 2, wherein the vehicle record indicates a location at which the vehicle sensor data is stored.

4. The computer-implemented method of claim 1, wherein the vehicle information includes event information recorded to the vehicle record.

5. The computer-implemented method of claim 1, wherein
   the request to calculate an insurance premium includes a security credential to access the vehicle information.

6. The computer-implemented method of claim 5, wherein:
   the request is a transaction written to the blockchain,
   the blockchain includes the asset smart contract configured to provide the security credential to the one or more processors in response to detecting the request, and
   receiving the security credential comprises:
      receiving, from a node of the blockchain enforcing the asset smart contract, the security credential.

7. The computer-implemented method of claim 6, wherein:
   to provide the security credential, the asset smart contract is configured to update a security node to indicate that the one or more processors are authorized to access the vehicle information, and
   the method further comprises:
      transmitting, via the one or more processors and to the security node, a request to access the vehicle information.

8. The computer-implemented method of claim 1, further comprising:
   generating, by the one or more processors, an insurance smart contract that is configured to (i) detect a transaction indicating the request to calculate the insurance premium for the vehicle, and (ii) automatically execute on the blockchain in response to detecting the request; and
   deploying, by the one or more processors, the insurance smart contract at a particular address on the blockchain.

9. The computer-implemented method of claim 8, wherein the insurance smart contract is configured to automatically execute an action in response to detecting the request, wherein the action includes:
   accessing the vehicle information,
   performing the analysis of the vehicle information to derive the insurance premium, and
   transmitting an indication of the insurance premium to the requestor.

10. A computer system for data portability using a blockchain, comprising:
    one or more processors; and
    a non-transitory program memory coupled to the one or more processors and storing executable instructions that, when executed by the one or more processors, cause the computer system to:
       receive, from a requestor, a request to calculate an insurance premium for a vehicle;
       receive, from the requestor, a digital signature created using a private key corresponding to a public key that is registered in a public key repository, wherein the public key repository is stored on the blockchain and accessible by an asset smart contract associated with the vehicle on the blockchain;

verify, via the asset smart contract, the digital signature using the public key repository;

identify a vehicle record on the blockchain related to the vehicle, wherein the vehicle record identifies vehicle information related to the vehicle, wherein access by the requestor to the vehicle information is governed by an access policy configured by a vehicle owner and enforced by the asset smart contract, wherein the access policy specifies one or more of scope, duration, or type of vehicle data accessible to the requestor, and wherein the asset smart contract determines an authorized subset of vehicle information made available to the one or more processors in accordance with the access policy;

analyze the authorized subset of vehicle information to derive the insurance premium; and transmit an indication of the insurance premium to the requestor.

11. The computer system of claim 10, wherein the vehicle information includes vehicle sensor data generated from sensors mounted on or within the vehicle.

12. The computer system of claim 11, wherein the vehicle record indicates a location at which the vehicle sensor data is stored.

13. The computer system of claim 10, wherein the vehicle information includes event information recorded to the vehicle record.

14. The computer system of claim 10, wherein
the request to calculate an insurance premium includes a security credential to access the vehicle information.

15. The computer system of claim 14, wherein:
the request is a transaction written to the blockchain,
the blockchain includes the asset smart contract configured to provide the security credential to the one or more processors in response to detecting the request, and
receiving the security credential comprises:
receive, from a node of the blockchain enforcing the asset smart contract, the security credential.

16. The computer system of claim 15, wherein:
to provide the security credential, the asset smart contract is configured to update a security node to indicate that the one or more processors are authorized to access the vehicle information, and
the executable instructions, when executed by the one or more processors, cause the computer system to:
transmit, to the security node, a request to access the vehicle information.

17. The computer system of claim 10, wherein the executable instructions, when executed by the one or more processors, further cause the computer system to:
generate an insurance smart contract that is configured to (i) detect a transaction indicating the request to calculate the insurance premium for the vehicle, and (ii) automatically execute on the blockchain in response to detecting the request; and
deploy the insurance smart contract at a particular address on the blockchain.

18. The computer system of claim 17, wherein the insurance smart contract is configured to automatically execute an action in response to detecting the request, wherein the action includes:
access the vehicle information,
perform the analysis of the vehicle information to derive the insurance premium, and
transmit an indication of the insurance premium to the requestor.

19. A tangible, non-transitory computer-readable medium storing executable instructions for data portability using a blockchain, that when executed by one or more processors of a computer system, cause the computer system to:
receive, from a requestor, a request to calculate an insurance premium for a vehicle;
receive, from the requestor, a digital signature created using a private key corresponding to a public key that is registered in a public key repository, wherein the public key repository is stored on the blockchain and accessible by an asset smart contract associated with the vehicle on the blockchain;
verify, via the asset smart contract, the digital signature using the public key repository;
identify a vehicle record on the blockchain related to the vehicle, wherein the vehicle record identifies vehicle information related to the vehicle, wherein access by the requestor to the vehicle information is governed by an access policy configured by a vehicle owner and enforced by the asset smart contract, wherein the access policy specifies one or more of scope, duration, or type of vehicle data accessible to the requestor, and wherein the asset smart contract determines an authorized subset of vehicle information made available to the one or more processors in accordance with the access policy;
analyze the authorized subset of vehicle information to derive the insurance premium; and
transmit an indication of the insurance premium to the requestor.

* * * * *